(12) United States Patent
Bohm et al.

(10) Patent No.: US 11,434,353 B2
(45) Date of Patent: Sep. 6, 2022

(54) METHOD AND PRODUCT OF MODIFYING VULCANIZED RUBBER

(71) Applicants: Georg Bohm, Akron, OH (US); Xuesong Yan, Shanghai (CN); Yu Sun, Cuyahoga Falls, OH (US); Li Jia, Hudson, OH (US)

(72) Inventors: Georg Bohm, Akron, OH (US); Xuesong Yan, Shanghai (CN); Yu Sun, Cuyahoga Falls, OH (US); Li Jia, Hudson, OH (US)

(73) Assignee: APPIA, LLC, Akron, OH (US)

( * ) Notice: Subject to any disclaimer, the term of this patent is extended or adjusted under 35 U.S.C. 154(b) by 0 days.

(21) Appl. No.: 16/787,716

(22) Filed: Feb. 11, 2020

(65) Prior Publication Data
US 2020/0255637 A1    Aug. 13, 2020

Related U.S. Application Data

(60) Provisional application No. 62/804,290, filed on Feb. 12, 2019.

(51) Int. Cl.
| | |
|---|---|
| C08L 17/00 | (2006.01) |
| C08C 19/08 | (2006.01) |
| B60C 1/00 | (2006.01) |

(52) U.S. Cl.
CPC .............. *C08L 17/00* (2013.01); *C08C 19/08* (2013.01); *B60C 1/00* (2013.01)

(58) Field of Classification Search
USPC .................................................... 521/41, 43
See application file for complete search history.

(56) References Cited

U.S. PATENT DOCUMENTS

| | | | |
|---|---|---|---|
| 3,003,990 A | 10/1961 | Umland, II et al. | |
| 3,489,710 A | 1/1970 | Bonotto et al. | |
| 4,231,410 A | 11/1980 | Vannan, Jr. | |
| 4,481,335 A * | 11/1984 | Stark, Jr. ............... | C08L 19/003 264/235.8 |
| 5,010,122 A | 4/1991 | Koski | |
| 5,376,700 A | 12/1994 | Yamazaki et al. | |
| 5,514,721 A | 5/1996 | Hart | |
| 5,538,793 A | 7/1996 | Inokuchi et al. | |
| 5,602,186 A | 2/1997 | Myers et al. | |
| 5,770,632 A | 6/1998 | Sekhar et al. | |
| 5,883,139 A | 3/1999 | Wideman et al. | |
| 6,265,454 B1 | 7/2001 | McNutt et al. | |
| 6,541,526 B1 | 4/2003 | Goldshtein et al. | |
| 6,831,105 B2 | 12/2004 | Dasseux et al. | |
| 6,924,319 B1 | 8/2005 | Alsdorf et al. | |
| 7,108,207 B2 | 9/2006 | Waznys et al. | |
| 7,445,170 B2 | 11/2008 | Cialone et al. | |
| 9,175,155 B2 | 11/2015 | Rosenmayer et al. | |
| 9,574,069 B2 | 2/2017 | Jasiunas et al. | |
| 9,815,974 B2 | 11/2017 | Jasiunas et al. | |
| 10,519,301 B2 | 12/2019 | Bohm | |
| 2004/0030053 A1 | 2/2004 | Izumoto et al. | |
| 2006/0258779 A1 | 11/2006 | Bailey et al. | |
| 2009/0289396 A1 | 11/2009 | Walters | |
| 2010/0317752 A1 | 12/2010 | Sekhar | |
| 2012/0116006 A1 | 5/2012 | Chun et al. | |
| 2012/0316283 A1 | 12/2012 | Rosenmayer et al. | |
| 2014/0088258 A1 | 3/2014 | Papp et al. | |
| 2015/0197581 A1 | 7/2015 | Asadauskas et al. | |
| 2016/0347926 A1 | 12/2016 | Rakhman et al. | |

FOREIGN PATENT DOCUMENTS

| | | | |
|---|---|---|---|
| CN | 102775633 A | 11/2012 | |
| EP | 0690091 A1 | 1/1996 | |
| EP | 0748837 A1 | 12/1996 | |
| EP | 0937742 A1 | 8/1999 | |
| EP | 0972792 A1 | 1/2000 | |
| EP | 1031440 A2 | 8/2000 | |
| EP | 1279698 A1 | 1/2003 | |
| EP | 2468803 A1 | 6/2012 | |
| JP | H0812815 A | 1/1996 | |
| WO | 2005028552 A1 | 3/2005 | |
| WO | WO-2005028552 A1 * | 3/2005 | ........... D06N 7/0081 |
| WO | WO-2007026167 A1 * | 3/2007 | ......... B29B 17/0042 |
| WO | 2010081632 A1 | 7/2010 | |
| WO | 2014042510 A1 | 3/2014 | |

\* cited by examiner

*Primary Examiner* — Terressa Boykin
(74) *Attorney, Agent, or Firm* — Dureska & Moore, LLC; Brent L. Moore; David J. Danko

(57) ABSTRACT

A method, and product thereof, for modifying the surface of recycled sulfur-cured rubber via surface devulcanization that minimizes alteration of the network structure of the recycled sulfur-cured rubber, while generating strong tack between mixed recycled rubber and fresh rubber for optimal adhesion upon subsequent co-curing. In one embodiment, the surface of recycled rubber is devulcanized by treating recycled rubber with a thiol and a base dissolved in a solvent that does not effectively penetrate and only minimally swells vulcanized rubbers.

20 Claims, 10 Drawing Sheets

METHOD AND PRODUCT OF MODIFYING VULCANIZED RUBBER

CROSS-REFERENCE TO RELATED APPLICATION

This application claims the benefit of U.S. Provisional Patent Application Ser. No. 62/804,290, filed Feb. 12, 2019.

BACKGROUND

Technical Field

The disclosed subject matter relates generally to modifying sulfur-cured or sulfur vulcanized rubber compounds in order to allow reuse of the sulfur-cured rubber compounds in rubber recycling methods without appreciable loss in performance of the resulting rubber compound. More particularly, the disclosed subject matter is directed to a method, and product thereof, for modifying the surface of recycled sulfur-cured rubber via surface devulcanization, which minimizes alteration of the network structure of the recycled sulfur-cured rubber, while generating strong tack between mixed recycled rubber and fresh rubber to provide optimal adhesion upon subsequent vulcanization. The method and product of modifying vulcanized rubber of the disclosed subject matter enables ground recycled sulfur-cured rubber particles with larger particles sizes to be utilized in the rubber recycling process, while providing a recycled rubber product with comparable or increased performance to those including smaller particle sizes. In addition, the method and product of modifying vulcanized rubber of the disclosed subject matter may allow a greater percentage of recycled rubber to be utilized in the rubber recycling process compared to prior art recycling methods, while providing a recycled rubber product with comparable or increased performance. The method and product of modifying vulcanized rubber of the disclosed subject matter also eliminates the need to fully devulcanize the recycled sulfur-cured rubber prior to subsequent vulcanization of the recycled rubber and fresh rubber, thereby eliminating an often complex and expensive step and decreasing the recycling operation costs.

Background Art

Rubber compounds, such as those used in vehicle tires, are composite materials that include polymers such as natural rubber or synthetic rubbers that have been blended with reinforcing fillers, such as carbon black or silica, as well as with a variety of additives such as sulfur. Such rubber compounds are then molded and vulcanized or cured into various shapes dependent on the specific intended use. The curing process of the tire is well known in the industry. It generally includes incorporating in the rubber compounds a mixture of curing agents including an accelerator, sulfur, and accelerator activating compounds, such as stearic acid and zinc oxide to facilitate the forming of sulfur cross-links upon application of heat to the rubber. Vulcanization results in the creation of a three dimensional network of sulfur cross-links within the rubber phase, which link the various polymer chains to form a dimensionally stable thermoset composite which cannot be reshaped once it has been formed and cured. As a result, the recycling and reuse of vulcanized rubber products, such as worn tires, is difficult because the vulcanized rubber cannot be reshaped or simply reconstituted by dissolving it in a solvent in order to form the vulcanized rubber into a new shape. When reference is made to "recycled rubber" or "ground rubber" within this disclosure, it is to be understood that the term refers to previously vulcanized rubber.

However, because of the ever increasing cost of oil derived raw materials, such as synthetic rubbers and carbon black fillers, and due to the environmental waste concerns of such materials, there is considerable interest in the reuse of products, such as worn vulcanized rubber tires made from these materials. For example, millions of used tires and other rubber products are discarded annually and only a minor fraction of them are being recycled into new products. The small amounts that are reused are usually first broken up to remove the non-rubber components of the tire, such as steel cords, beads, etc., and the remaining rubber compound is ground-up into rubber particles of different sizes for use in a wide variety of applications, such as synthetic turf for football, soccer, and other sport related playing surfaces. Additional applications of these ground-up vulcanized rubber particles include use of the products in molded or extruded materials such as floor mats, etc. Reuse of such recycled rubber products in high performance products, such as tires, is limited to exceedingly small quantities because the ground rubber particles typically adversely affect key properties vital to the performance of the tire.

More particularly, most of these adverse effects result because the vulcanized ground rubber particles do not dissolve in the fresh rubber compound on a molecular scale, but instead stay intact and often act as defects once the product is processed by molding and vulcanization of the new composition. When reference is made to "fresh rubber" within this disclosure, it is to be understood that the term refers to previously unvulcanized rubber. There are two types of defects that typically result from incorporating the vulcanized ground rubber particles into fresh rubber compounds. The first relates to a defect generated because of poor bonding between the ground rubber particles and the fresh new matrix rubber and arises mainly because of insufficient molecular inter-diffusion of the rubber macromolecules. Therefore, when stress is applied to the resulting end product, small gaps will form where the new matrix of fresh rubber separates from the vulcanized ground rubber particle which will subsequently grow into larger propagating cracks and ultimately cause failure.

The second type of defect arises because the recycled rubber particles generally will have much higher cross-link density in the final product than the fresh new matrix rubber in which they are embedded. More specifically, some of the sulfur and cure accelerators added to the fresh rubber compound for vulcanization will diffuse into the recycled rubber particles during the mixing, shaping, and vulcanization steps and cause the recycled ground rubber particles to experience a significant additional cross-linking or second vulcanization. This second vulcanization results in a much higher cross-link density, a higher modulus, and a significantly lower extension to break in the ground rubber phase. Thus, when the final product is significantly deformed during use, premature failure will occur in the recycled rubber particles because this phase will reach conditions to failure at much lower strains compared to the new rubber phase. Micro-cracks formed in the process will at first propagate through the particle and then continue to propagate through the product potentially causing it to fail during use. The difference in moduli will, on deformation, also result in interfacial stresses between the rubber particles and the surrounding host matrix that can significantly promote the micro-separations (gaps), referred to earlier and ultimately lead to growing micro-cracks and product failure.

These defects manifest themselves even at relatively low recycled ground rubber concentrations resulting in a reduced tensile strength, poor cut growth performance and reduced durability. With regard to tire manufactures, there is a great reluctance on the part of many tire manufacturers to incorporate tire buffings and ground rubber particles from whole tires into fresh rubber tire compounds due to the problems described above and the to be expected reductions in tire performance.

Many studies conducted and often published in journals show that the incorporation of recycled rubber from spent tires into fresh rubber generally results in compounds having significantly diminished physical properties such as a reduction in tensile strength, reduced durability, and poor cut growth performance. It was previously believed that many factors contributed to these diminished physical properties, including differences in the composition of the recycled rubber particles from the fresh rubber compound, as well as exposure of the recycled rubber particles to extended periods of heat and oxidative environments, etc., during the period when the recycled rubber was part of a tire in service. However, testing has shown that elimination of these factors still results in a compound having significantly diminished physical properties. For example, freshly prepared cryogenically ground rubber particles made from a typical carbon black reinforced stock with a composition set forth in Table 1 below, incorporated at a concentration level of 5-20 phr into a fresh rubber compound of the same composition yield the results set forth in Table 2 below.

TABLE 1

| | Compounds Comprising Ground Rubber | | | | | | | | | | | | | |
|---|---|---|---|---|---|---|---|---|---|---|---|---|---|---|
| | UR1 | | UR2 | | UR3 | | UR4 | | UR5 | | UR6 | | Control | |
| MB at 50 rpm starting at 100 C. with drop at 3 min or at T = 150 C. | | | | | | | | | | | | | | |
| F3-MB | 100 | | 100 | | 100 | | 100 | | 100 | | 100 | | 100 | |
| F3-Ground Rubber | 5% | | 5% | | 10% | | 10% | | 20% | | 20% | | | |
| Batch weight (g) | 50 | | 50 | | 50 | | 50 | | 50 | | 50 | | 50 | |
| MB weight (g) | 47.6 | | 47.6 | | 45.5 | | 45.5 | | 41.5 | | 41.5 | | 50 | |
| Ground Rubber weight (g) | 2.4 | | 2.4 | | 4.5 | | 4.5 | | 8.5 | | 8.5 | | 0 | |
| Rubber in MB | 32.8 | | 32.8 | | 31.4 | | 31.4 | | 28.7 | | 28.7 | | 34.5 | |
| Rubber in ground rubber | 1.65 | | 1.65 | | 3.1 | | 3.1 | | 5.8 | | 5.8 | | 0 | |
| Total Rubber (MB + GR) | 34.4 | | 34.5 | | 34.5 | | 34.5 | | 34.5 | | 34.5 | | 34.5 | |
| Finals at 30 rpm starting at 30 C. with drop at 3 min or at T = 90 C. | 0 | | +5 | | +5 | | +10 | | +10 | | +20 | | | |
| Stearic Acid | 2 | 0.66 | 2 | 0.66 | 2 | 0.63 | 2 | 0.63 | 2 | 0.57 | 2 | 0.57 | 2 | 0.69 |
| ZnO | 2 | 0.66 | 2 | 0.66 | 2 | 0.63 | 2 | 0.63 | 2 | 0.57 | 2 | 0.57 | 2 | 0.69 |
| Sulfur | 1.25 | 0.41 | 1.31 | 0.43 | 1.31 | 0.41 | 1.37 | 0.43 | 1.37 | 0.39 | 1.5 | 0.43 | 1.25 | 0.43 |
| TBBS | 0.83 | 0.27 | 0.87 | 0.28 | 0.87 | 0.27 | 0.91 | 0.29 | 0.91 | 0.26 | 1.00 | 0.29 | 0.83 | 0.29 |
| MH | 51.92 | | 52.99 | | 55.09 | | 53.27 | | 51.08 | | 57.02 | | 56.98 | |
| ML | 19.49 | | 19.46 | | 20.91 | | 21.39 | | 23.69 | | 23.68 | | 18.97 | |

Each compound R1-R7 should be molded and cured into a plaque (6" × 6" × 0.060") for stress-strain and tear tests

TABLE 2

| Test Conducted | UR1 | UR2 | UR3 | UR4 | UR5 | UR6 | Control |
|---|---|---|---|---|---|---|---|
| Stress-Strain | | | | | | | |
| 100% Modulus (psi) | 185 | 171 | 174 | 163 | 156 | 128 | 188 |
| | 168 | 161 | 165 | 160 | 157 | 124 | 189 |
| Average | 176 | 166 | 170 | 161 | 157 | 126 | 188 |
| Remix Average | 177 | 190 | 171 | 185 | 184 | 199 | 182 |
| 300% Modulus (psi) | 800 | 709 | 728 | 657 | 625 | 792 | 815 |
| | 690 | 638 | 672 | 631 | 641 | 766 | 801 |
| Average | 745 | 674 | 700 | 645 | 633 | 779 | 809 |
| % of control | 92 | 83 | 86 | 80 | 78 | 96 | 100 |
| Remix Average | 755 | 813 | 714 | 788 | 777 | 841 | 789 |
| Tensile Strength (psi) | 1331 | 1040 | 1187 | 1182 | 885 | 1078 | 1695 |
| | 1314 | 1299 | 1165 | 1018 | 961 | 1025 | 1835 |
| Average | 1323 | 1169 | 1176 | 1100 | 923 | 1051 | 1765 |
| % of control | 75 | 66 | 67 | 62 | 52 | 60 | 100 |
| Remix Average | 1415 | 1368 | 1228 | 1279 | 1047 | 1126 | 1986 |
| Elongation at Break (%) | 409 | 378 | 404 | 427 | 365 | 359 | 487 |
| | 439 | 451 | 414 | 398 | 382 | 354 | 523 |
| Average | 424 | 415 | 409 | 412 | 373 | 357 | 505 |
| % of control | 84 | 82 | 81 | 82 | 74 | 71 | 100 |
| Remix Average | 443 | 414 | 413 | 402 | 359 | 358 | 539 |
| Normalized Tensile Quality (%) | | | | | | 41 | 100 |
| Solvent Swelling (in Toluene) | | | | | | | |
| Wswollen/Wdry | 3.77 | 3.97 | 4.02 | 3.97 | 4.45 | 3.9 | |

Approximately a 25% decrease in tensile strength results when only 5 phr of ground rubber is added, while approximately a 30% decrease occurs from the addition of 10 phr. The addition of 20 phr of ground rubber decreases the tensile strength by almost 50%. The results indicate that a small addition of ground rubber, even under ideal conditions where compositions are identical and where the ground rubber has not been subjected to heat and oxidative environments, can still have a substantial effect on the physical properties of the cured rubber compound. It is thus believed that the primary cause of performance losses encountered in the recycling of cured rubber particles is the additional crosslinking taking place in the rubber particles during the curing of the final rubber composition as well as insufficient bonding of the cured particles to the fresh host rubber compound to which they were added.

An experiment was carried out to identify and measure the additional crosslinking that occurs during inter-diffusion of cure additives to recycled rubber. The experiment was designed to simulate the environment in which ground recycled rubber is embedded in a fresh rubber compound during curing. In the experiment, a cured rubber sheet was placed on top of a 2 mm thick sheet of EPR (ethylene/propylene/copolymer) gum rubber which contained a small concentration of additives that are normally used to induce the curing of rubber, which included sulfur and cure accelerators, such as TBBS, along with ZnO and stearic acid. The cure additives induce additional crosslinking only in the previously cured rubber layer due to the saturated structure of the EPR layer. The layers were placed in a mold, compressed and exposed to temperatures of 160 degrees Celsius for 25 minutes, which is typical for curing. The EPR layer was subsequently peeled off and stress strain tests were performed on the treated rubber layer using micro-dumbbells. The 50% and 100% moduli were used as a relative measure of crosslink density. The results of the experiment are set forth in FIG. 1.

The experiment shows that the addition of heat alone (L1) will not result in a change in modulus relative to the L0 control, but small increases in modulus occurred with the addition of sulfur (L2). Greater increases were realized with the inter-diffusion of the TBBS cure accelerator alone, and increases greater than 100% occurred in the L4 and L5 laminates in which a combination of sulfur and a cure accelerator were added. The consequence is that the addition of cure accelerating ingredients during the vulcanization process increases the number of crosslinks within the rubber. Similar increases in moduli are expected to be induced in ground rubber particles during vulcanization of the recycled rubber.

Laminate experiments can also be used to explore the degree of bonding achieved between recycled rubber and fresh rubber. The degree of bonding can critically affect the physical properties of the cured composites. In one particular experiment, a cured and an uncured rubber strip 25 mm in width both backed up with a 1.5 mm thick fiber-reinforced rubber layer were co-vulcanized or co-cured at 160° C. for 20 minutes in a mold under pressure. A 30 mm long thin Mylar film was placed between the two sheets on one end to prevent bonding in that area. Following co-curing, this area easily separates and allows an easy clamping of the two ends in a tensile tester to measure the peel forces required to separate the two layers of the composite. The results are set forth in Table 3 below.

TABLE 3

Peel Strength Data from Initial Laminate Testing - May 30, 2017

| Sample | Insert (0.125" wide) | Sep. Rate (inch/min) | Backing Cord Orientation | Avg. Peel Force (lb) | Avg. Peel Strength (lb/inch) | Peak Peel Strength (lb/inch) | Comments |
|---|---|---|---|---|---|---|---|
| UU-1 | yes | 0.5 | ok | 26.8 | 204 | 214 | Used plastic insert with narrow slot |
| UU-2 | yes | 2.0 | wrong | 25 | 200 | 273 | " |
| UU-3 | no | 2.0 | wrong | | | | "" tore through at 50 lb force |
| UC-4 | no | 2.0 | ok | | 4.9 | 6.8 | |
| UC-5 | no | 2.0 | wrong | | 5.7 | 7.6 | |
| UC-6 | no | 2.0 | ok | | 5.0 | 6.4 | |

The results show that the peel forces in laminates made from two uncured sheets (UU-1 and UU-2) were over 200 lb/inch. In stark contrast, laminates assembled from a cured and uncured sheet separated with an average peel force of about 5 lb/inch. Changing the cord orientation of the backing layer had little effect on the peel forces measured as expected under these experimental conditions. A recycled rubber particle being co-vulcanized with a fresh rubber stock will experience very similar temperature, pressure and time exposure and is thus expected to also show poor interphase bonding.

Prior art rubber recycling methods have addressed some of the potential problems associated with recycling rubber described above by utilizing a method to first fully devulcanize the previously cured and to be recycled rubber, prior to mixing the recycled rubber with fresh rubber and recurring/reprocessing. Although many different prior art methods of devulcanization exist, the prior art methods generally include first grinding the recycled rubber to a suitable size and then employing a process to reduce the concentration of sulfur cross-links in the recycled rubber prior to mixing the recycled rubber with fresh rubber and ultimately curing the essentially devulcanized mixture. Although such prior art methods can be effective in avoiding some of the potential issues with utilizing recycled rubber, the methods are generally complex, add significant time and cost to the rubber product manufacturing process, and often results in significant and very undesirable structural changes of the rubber molecules. In addition, the chemical reactivity of such devulcanized recycled rubbers are typically different from those of fresh rubber, and it is generally difficult to achieve the properties of vulcanizates of fresh rubber using such recycled rubber. While the use of untreated recycled rubber for high performance product applications is generally limited to about 1-2% the use of partially devulcanized recycled rubber may only be slightly larger due to current limitations of the devulcanization process.

In addition, such prior art rubber recycling methods generally require the ground rubber particles to exhibit relatively small particle sizes, such as 200 mesh or smaller, requiring expensive manufacturing processes, such as cryogenic grinding techniques utilizing nitrogen, which increases the overall cost of the rubber recycling processes, and in some instances, render such rubber recycling methods economically unfeasible.

An alternative approach is to modify the surface of ground rubber particles to compatabilize or enhance the reactivity of the ground rubber with ground fresh rubber, thermoplastic elastomers, and thermoplastics. For example, a prior art method of surface devulcanization via microbial activation has been utilized to selectively devulcanize the surface layer of ground rubber particles less than 1 µm thick. This method alters the surface by subtraction of crosslinks instead of by addition of reactive groups or compatibilizing oligomers/polymer chains. However, the process is undesirably slow, often taking weeks, which greatly limits the recycling process turn-around.

Thus, a need exists in the art for a method of modifying vulcanized rubber that generates strong tack between recycled rubber and fresh rubber prior to vulcanization to provide optimal adhesion upon subsequent vulcanization. A need also exists in the art for a method of modifying recycled rubber that enables ground recycled sulfur-cured rubber particles with relatively larger particle sizes, such as 60 mesh or larger, to be utilized in rubber recycling processes, and products thereof, while providing a recycled rubber product with comparable or increased performance to products of rubber recycling methods that require use of ground recycled sulfur-cured rubber particles with smaller particle sizes, such as 200 mesh or smaller. There also exists a need in the art for a method of modifying vulcanized rubber that allows a greater percentage of recycled rubber to be utilized in the rubber recycling process, while providing a recycled rubber product with comparable or increased performance. In addition, there is also a need in the art for a method of modifying vulcanized rubber that eliminates the need to fully devulcanize the recycled sulfur-cured rubber prior to vulcanization with fresh rubber to eliminate an often complex and expensive step, thereby decreasing recycling operation costs. The method of modifying vulcanized rubber of the disclosed subject matter satisfies these needs, and will now be described.

BRIEF SUMMARY

An objective of the disclosed subject matter is to provide a method and product of modifying vulcanized rubber which minimizes alteration of the network structure of the recycled sulfur-cured rubber, while generating strong tack between mixed recycled rubber and fresh rubber to provide optimal adhesion upon subsequent co-curing.

Another objective of the disclosed subject matter is to provide a method and product of modifying vulcanized rubber that enables ground recycled sulfur-cured rubber particles that have larger particle sizes to be utilized in the rubber recycling process, while providing a recycled rubber product with comparable or increased performance compared to products of rubber recycling methods that require the use of ground recycled sulfur-cured rubber particles with smaller particle sizes.

Yet another objective of the disclosed subject matter is to provide a method and product of modifying vulcanized rubber that allows a greater percentage of recycled rubber to be utilized in the rubber recycling process compared to prior art rubber recycling methods, while providing a recycled rubber product with comparable or increased performance.

Still another objective of the disclosed subject matter is to provide a method and product of modifying vulcanized rubber that eliminates the need to fully devulcanize the recycled sulfur-cured rubber prior to subsequent co-curing with fresh rubber, thereby eliminating complex and expensive process steps and decreasing the recycling operation costs.

Yet another objective of the disclosed subject matter is to provide a vulcanizable product ready for further processing comprising a mixture of surface-devulcanized ground rubber particles modified in accordance with the method of modifying vulcanized rubber of the disclosed subject matter and ground fresh rubber.

These objectives and others are achieved by the method of modifying vulcanized rubber of the subject disclosure, which includes the steps of providing a recycled rubber compound; grinding the recycled rubber compound to form ground rubber particles; and devulcanizing the surface of the ground rubber particles with a surface devulcanization agent to form surface-devulcanized ground rubber particles.

These objectives and others are also achieved by a vulcanizable rubber product of the disclosed subject matter comprising a mixture of surface-devulcanized ground rubber particles and ground fresh rubber.

These objectives and others are also achieved by a vulcanizable rubber product of the disclosed subject matter comprising a mixture of ground rubber particles, ground fresh rubber, and an agent that reduces the modulus differences at the interface between the ground rubber particles and fresh rubber upon co-curing.

BRIEF DESCRIPTION OF THE SEVERAL VIEWS OF THE DRAWINGS

The exemplary embodiments of the disclosed subject matter, illustrative of the best modes in which Applicant has contemplated applying the principles of the disclosed subject matter, are set forth in the following description and are shown in the drawings.

DETAILED DESCRIPTION

Figure 1:
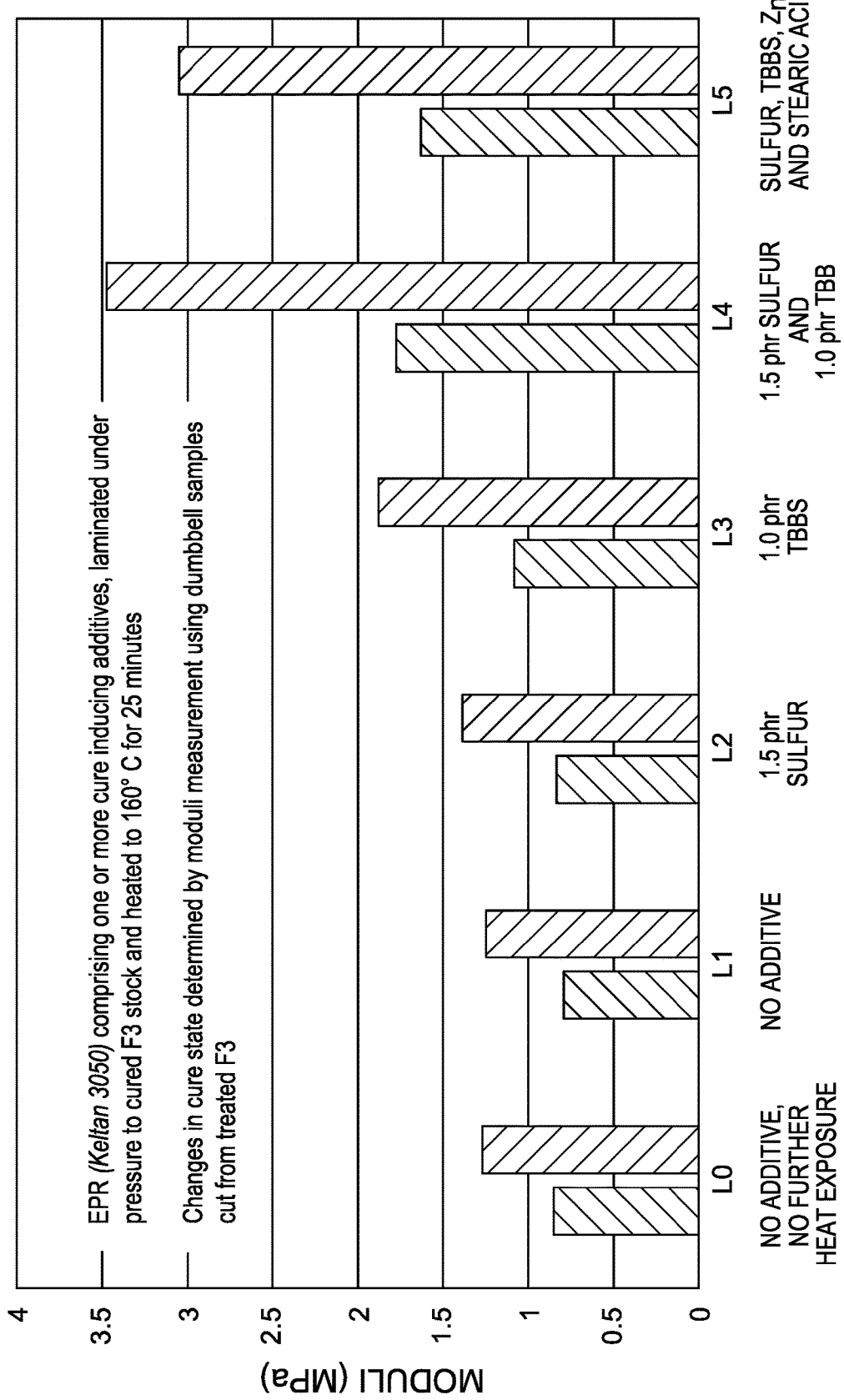
FIG. 1 is a graph of results generated from an experiment conducted to identify and measure the additional crosslinking that occurs during inter-diffusion of various cure additives when added to recycled rubber prior to vulcanization.

The method of modifying vulcanized rubber according to the disclosed subject matter generally includes the steps of providing a recycled rubber compound, devulcanizing the surface of the previously sulfur-vulcanized rubber compound utilizing butylthiol (n-butylthiol) and a suitable solvent, washing the surface devulcanized rubber compound with the same or a second solvent, drying the surface devulcanized rubber compound, and co-curing the surface devulcanized rubber compound with a fresh rubber compound. Depending on the particular use, the recycled rubber compound can be converted into small particles by grinding or shaving, such as grinding or shaving the rubbers of a whole tire as part of a tire recycling operation, prior to modification via surface devulcanization.

Examples 1A/B, Examples 2A/B/C, Examples 3A/B, Example 4, Example 5, and Example 6 all in accordance with the method of modifying vulcanized rubber of the disclosed subject matter, were performed and are described below.

EXAMPLES 1A/B

Overview

Examples 1A/B generally includes treating recycled rubber compounds with a surface devulcanization agent(s), for example a catalyst, that causes the breakage of a significant fraction of the di- and polysulfidic crosslinks located near the surface of the recycled rubber. More specifically, Examples 1A/B generally includes the steps of treating the recycled rubber with 1 M butylthiol in piperidine, washing the treated recycled rubber with toluene, and drying the washed recycled rubber to obtain a surface devulcanized recycled rubber compound.

I. EXAMPLE 1A

Macroscale T-Peel Studies

It has been found that the degree of tackiness recycled rubber exhibits via surface devulcanization correlates to the strength of adhesion or interfacial strength between recycled rubber and fresh rubber upon subsequent vulcanization, with increased tackiness promoting greater strength of adhesion. To demonstrate the correlation between the degree of tackiness and adhesion on interfacial strength of recycled rubber treated in accordance with Example 1A, as indicated below, and fresh rubber, as well as the effectiveness of macroscale application of the method and feasibility of microscale application, macroscale T-peel studies were performed. In the macroscale T-peel studies, laminates of fresh rubber strips and vulcanized rubber strips were utilized to demonstrate both pre-co-curing physical adhesion between fresh rubber and vulcanized rubber treated in accordance with Example 1A, as indicated below, and adhesion/interfacial strength after co-curing. The formulation of the rubber compounds utilized in the T-peel studies are shown in Table 4 below.

TABLE 4

Formulation of rubber compounds for T-peel studies.

| Ingredients | Butadiene Rubber | Carbon Black N330 | Stearic acid | ZnO | Sulfur | TBBS |
|---|---|---|---|---|---|---|
| Phr | 100 | 40 | 2 | 2 | 1.25 | 0.83 |

As indicated in Table 4, a rubber compound was prepared by mixing 100 phr butadiene rubber, 40 phr carbon black N330, 2 phr stearic acid, 2 phr ZnO, 1.25 phr sulfur, and 0.83 phr TBBS using a Brabender internal mixer following suitable standard procedures known in the art. The rubber compound was used to prepare fiber-reinforced unvulcanized rubber strips, or "fresh rubber strips", and vulcanized rubber strips. More specifically, the rubber compound was mixed and sheeted out to about 90 mil gauge and then combined with a commercially available cord reinforced stock with 50 mil gauge and two 4 mil thick Mylar films on the outer sides of the composite. Two such composites were made. One of the composites was the placed in a 6 inch×6 inch×0.12 inch steel mold and cured at 160 degrees Celsius for 25 minutes, while the other composite was only molded at 93.3 degrees Celsius for 15 minutes. After extraction from the mold, the cured and the uncured composites were cut into 1.27 cm×7.62 cm strips with the cord orientation parallel to the length direction of the strips.

The uncured or unvulcanized 1.27 cm×7.62 cm strips are referred to herein as "fresh rubber strips". The cured or vulcanized 1.27 cm×7.62 cm strips were buffed with a Dremel 200 grinding wheel and where blown with compressed air to remove any rubber powder from the surfaces. For purposes of this disclosure, the cured rubber strips treated in accordance with above are referred to as "vulcanized rubber strips" or "Strip(s)-0".

A vulcanized rubber strip prepared in accordance with above was treated according to Example 1A. Specifically, the vulcanized rubber strip was immersed in a solution of 1M butylthiol in piperidine for 10 seconds. The excess solution was immediately wiped away from the vulcanized rubber strip with a paper towel. The surface of the vulcanized rubber strip slightly swelled. The vulcanized rubber strip was then wrapped in aluminum foil and placed in a covered petri dish at room temperature for 1 hour, and then was rinsed with fresh toluene for 10 seconds. The vulcanized rubber strip was then dried in a vacuum oven at room temperature. For purposes of this disclosure, the strip is designated as a strip treated in accordance with Example 1A or "Strip(s)-1". Once treated in accordance with Example 1A, Strip-1 exhibited a tacky surface, without affecting the overall integrity of the strip.

a. Physical Adhesion as a Result of Tackiness

To determine and demonstrate the degree of physical adhesion between vulcanized rubber treated in accordance with Example 1A and fresh rubber, a control sample, or "sample L", was prepared by placing a 1.27 cm×2.54 cm Mylar film between two fresh rubber strips on one end to prevent contact of the two fresh rubber sheets in that area. A sample L-0 was prepared by placing a 1.27 cm×2.54 cm Mylar film between a fresh rubber strip and a vulcanized rubber strip (Strip-0) on one end to prevent contact of the fresh rubber strip and the vulcanized rubber strip in that area. A sample L-1 was prepared by placing a 1.27 cm×2.54 cm Mylar film between a vulcanized rubber strip treated in accordance with Example 1A (Strip-1) and a fresh rubber strip.

Sample L, sample L-0, and sample L-1 were each placed in an aluminum mold with a window of the same dimensions as the samples. The molds were then placed in a Dake Hydraulic Mod 4419 press under 0.5 Ton of pressure for 24 hours at room temperature. After release of the pressure, the samples were allowed to rest at ambient pressure until testing. The Mylar film was removed from each of sample L, sample L-0, and sample L-1. T-peel tests were then performed on each of sample L, sample L-0, and sample L-1 utilizing an Instron Model 5567 tensile tester equipped with a 1000 N load cell, with a crosshead speed set at 50.8 mm/min. Each one of sample L, sample L-0, and sample L-1 was stretched until the respective strips completely separated. The peeling strength or peeling force was calculated by dividing the force detected by the width of the specimen and the fracture energy was calculated by multiplying the peeling strength by the distance. The results are indicated in FIG. 2.

Figure 2:
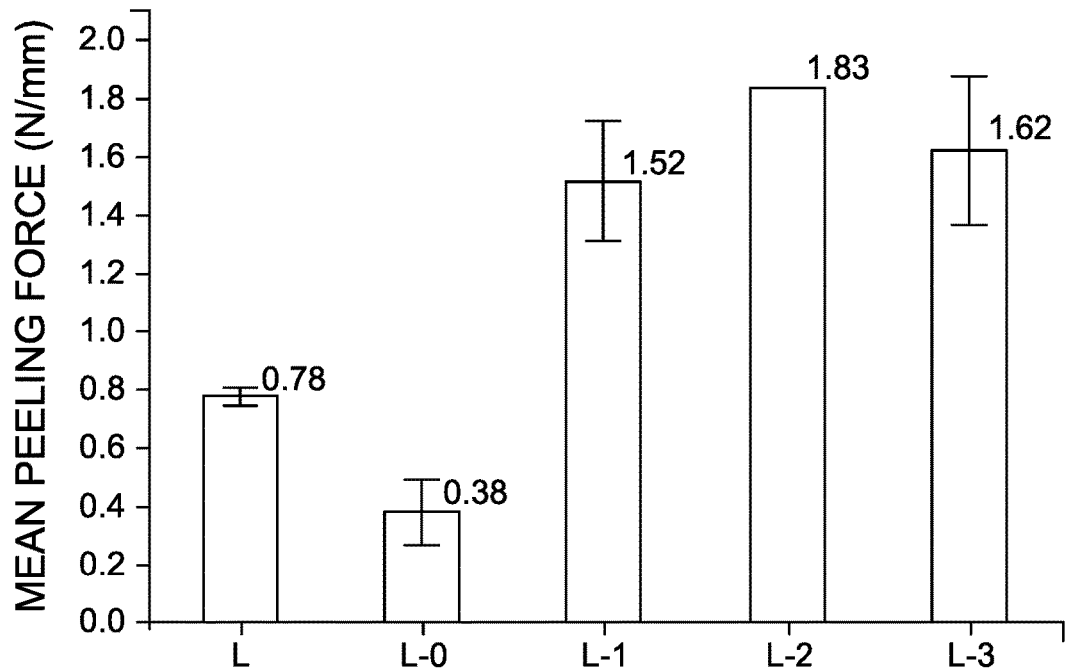
FIG. 2 is a graph of results generated from macro-scale T-peel studies that demonstrate the physical adhesion between vulcanized rubber that is surface devulcanized and fresh rubber.

As shown in FIG. 2, the average peeling force to separate the two fresh rubber strips of sample L is approximately 0.78 N/mm. The average peeling force to separate the vulcanized rubber strip and the fresh rubber strip of sample L-0 is approximately 0.38 N/mm. In comparison, the average peeling force to separate the fresh rubber strip and the vulcanized rubber strip modified via surface devulcanization in accordance with Example 1A of sample L-1 is approximately 1.52 N/mm, nearly double the force required to separate the fresh rubber strips of sample L, and approximately four times the force required to separate the vulcanized rubber strip and the fresh rubber strip of sample L-0.

As is shown by the data provided by the physical adhesion results in FIG. 2, when a vulcanized rubber strip is modified by surface devulcanization in accordance with Example 1A, the tackiness exhibited by the surface of the treated vulcanized rubber strip promotes a strong interface between the fresh rubber strip due to physical adhesion.

b. Interfacial Strength After Co-curing of Laminates

To determine and demonstrate the effect that increased pre-vulcanization physical adhesion has on interfacial strength upon subsequent co-curing or vulcanization at a macroscale level, and thus the feasibility of utilizing first exemplary embodiment method for modifying vulcanized rubber at a microscale, e.g. with ground vulcanized rubber, T-peel studies were performed on co-cured laminates of fresh rubber and vulcanized rubber modified in accordance with Example 1A. A sample L, a sample L-0, and a sample L-1 were prepared in accordance with the examples above. Sample L, sample L-0, and sample L-1 were each placed in an aluminum mold with a window of the same dimensions as the samples. The molds were then placed in a Dake Hydraulic Mod 4419 press under 0.5 Ton of pressure at 150 degrees Celsius for 25 minutes to co-cure the respective sample laminates. The Mylar film was removed from each of each co-cured sample L, sample L-0, and sample L-1. T-peel tests were then performed on each of co-cured sample L, sample L-0, and sample L-1 utilizing an Instron Model 5567 tensile tester equipped with a 1000 N load cell, with a crosshead speed set at 50.8 mm/min. Each one of co-cured sample L, sample L-0, and sample L-1 was stretched until the respective strips completely separated. The peeling strength or peeling force was calculated by dividing the force detected by the width of the specimen and the fracture energy was calculated by multiplying the peeling strength by the distance. The results are indicated in FIG. 3.

Figure 3:
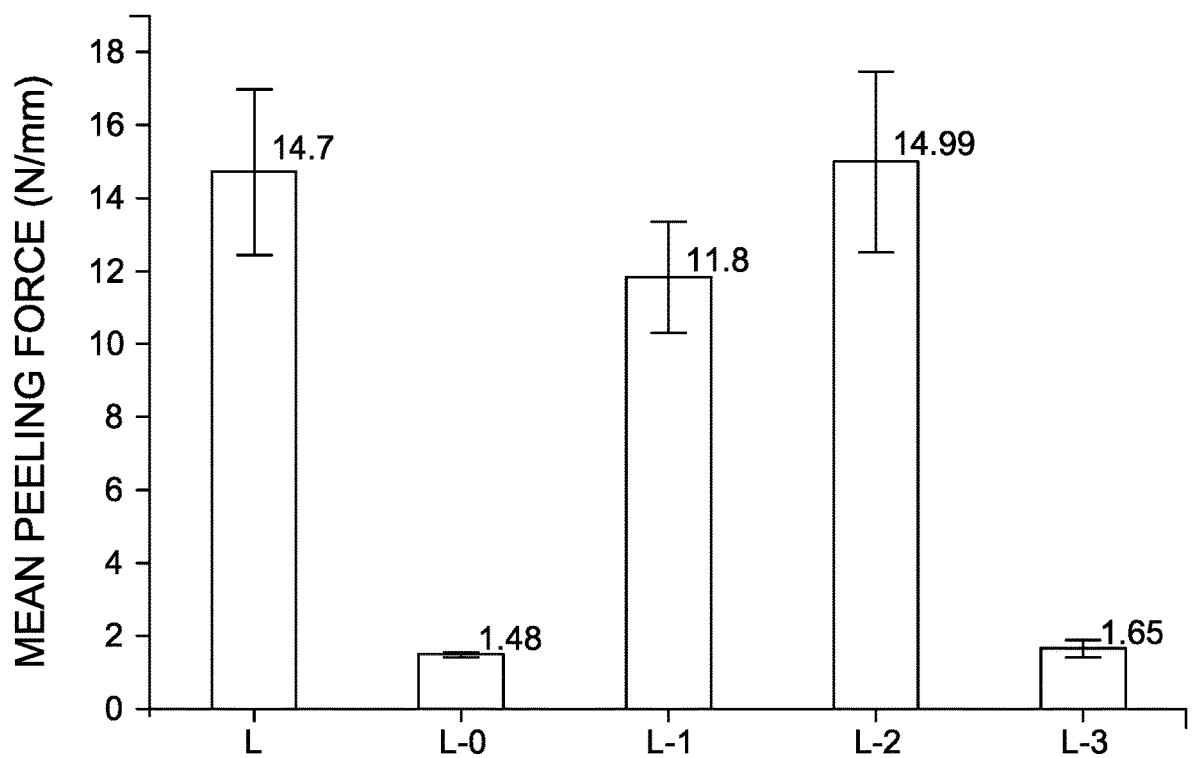
FIG. 3 is a graph of results generated from macro-scale T-peel studies that demonstrate adhesion/interfacial strength between vulcanized rubber that was surface devulcanized and fresh rubber upon co-curing.

As shown in FIG. 3, the average peeling force to separate the two co-cured fresh rubber strips of sample L is approximately 14.7 N/mm. The average peeling force to separate the co-cured vulcanized rubber strip and the fresh rubber strip of sample L-0 is approximately 1.48 N/mm. In comparison, the average peeling force to separate the co-cured fresh rubber strip and the vulcanized rubber strip modified via surface devulcanization in accordance with Example 1A of sample L-1 is approximately 11.8 N/mm, or approximately eight times the peeling force required to separate co-cured fresh rubber and vulcanized rubber strips (sample L-0), and approximately 80 percent (%) of the force required to separate the two co-cured fresh rubber strips of sample L. Thus, at a macroscale, when the surface of the vulcanized rubber is modified via surface devulcanization according to Example 1A, there is a significant increase in interfacial strength between the co-cured vulcanized rubber and fresh rubber.

Comparison of the data from T-peel studies performed on un-cured sample L, sample L-0, and sample L-1 (FIG. 2) to T-peel studies performed on co-cured sample L, sample L-0, and sample L-1 (FIG. 3) generally supports a finding that increased physical adhesion between fresh rubber and vulcanized rubber via increased tack between the rubbers by modification of the vulcanized rubber via surface devulcanization in accordance with the disclosed subject matter increases interfacial strength upon subsequent co-curing or vulcanization.

c. Nanoindentation Study

Although the T-peel studies support the general conclusion that increased pre-cure tackiness between surface devulcanized recycled rubber and fresh rubber promotes greater interfacial strength upon co-curing, the relative interfacial strength of co-cured sample L-0 and sample L-1 compared to co-cured sample L is lower than relative adhesion strength of sample L-0 and sample L-1 compared to sample L, as is shown by comparison of the physical adhesion T-peel study and the interfacial T-peel studies. To understand why the relative interfacial strength of co-cured sample L-0 and sample L-1 compared to co-cured sample L is lower than relative adhesion strength of sample L-0 and sample L-1 compared to sample L, as indicated by comparison of the relative results shown in FIG. 2 and FIG. 3, a nanoindentation study comparing the modulus near the interfaces of a nanoindentation sample comprising two co-cured strips-0 ("nanoindentation sample L-0") and a nanoindentation sample comprising a fresh rubber strip co-cured with a Strip-1 modified by surface devulcanization in accordance with Example 1A ("nanoindentation sample L-1") was performed.

Strips-0, the fresh rubber strip, and Strip-1 were prepared in accordance with the T-peel studies described above. Nanoindentation sample L-0 was prepared by placing two strips-0 in a metal mold and co-curing the strips following the same procedure as above for co-curing sample L-1. The co-cured laminate was imbedded in 635 thin epoxy resin. The 635 thin epoxy resin was allowed to cure for four days at room temperature to ensure complete curing. A cross-section of the embedded laminate was taken through the co-cured strips-0 and the cross-sectional surface of the laminate was then ground on a grinding machine with a 60 grit sandpaper belt. The cross-sectional surface of the laminate was then manually ground with 160 grit, 400 grit, 800 grit, and 1200 grit sandpapers. Likewise, nanoindentation sample L-1 was prepared by placing a fresh rubber strip and a Strip-1 in a metal mold and co-curing the strips following the same procedure as above for co-curing sample L-1. The co-cured laminate was imbedded in 635 thin epoxy resin. The 635 thin epoxy resin was allowed to cure for four days at room temperature to ensure complete curing. A cross-section of the embedded laminate was taken through the co-cured fresh rubber strip and Strip-1 and the cross-sectional surface of the laminate was then ground on a grinding machine with a 60 grit sandpaper belt. The cross-sectional surface of the laminate was then manually ground with 160 grit, 400 grit, 800 grit, and 1200 grit sandpapers. The modulus of the cross-sectional surface of the laminate was mapped by loading a stainless steel probe tip into the cross-section of the laminate and quantitatively monitoring the indentation with a linearly variable differential transducer utilizing equipment similar to that described in Rubber Chemistry and Technology Vol. 74, No 3, pg. 428, 2001. The nanoindentation results for nanoindentation sample L-0 and nanoindentation sample L-1 are shown in FIG. 4 and FIG. 5, respectively.

Figure 4:
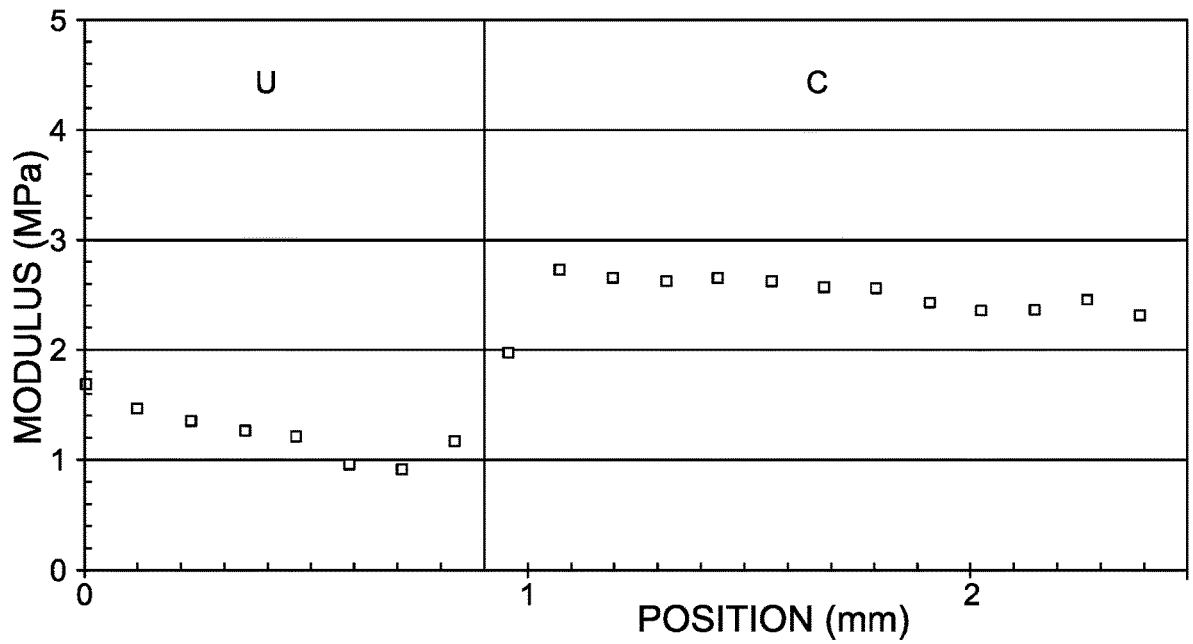
FIG. 4 is a graph of results generated from a nanoindentation study comparing the modulus near the interface of a nanoindentation sample comprising a fresh rubber strip co-cured with a vulcanized rubber strip.
Figure 5:
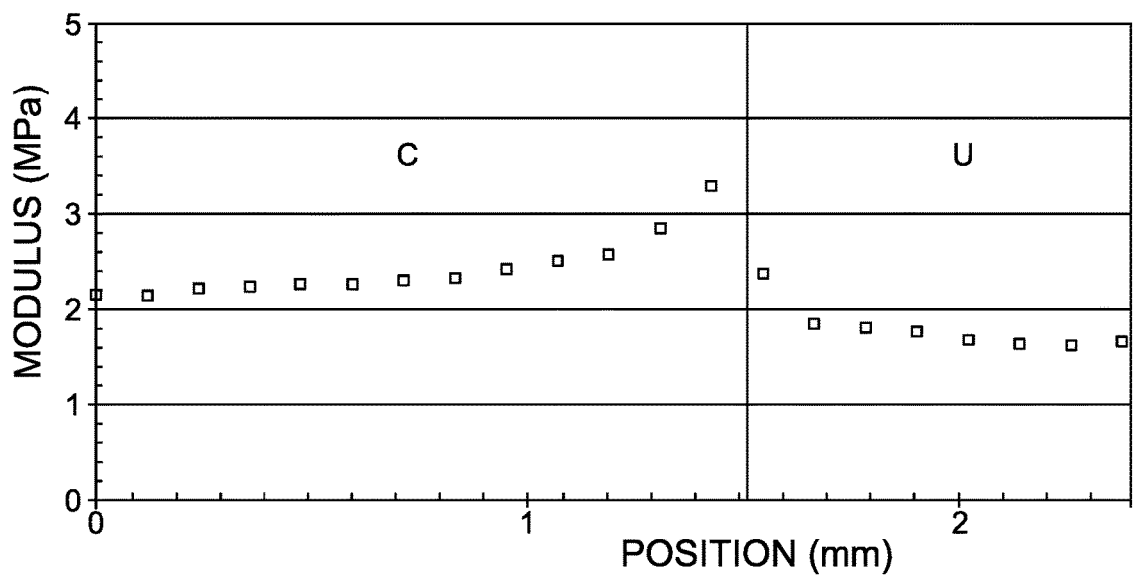
FIG. 5 is a is a graph of results generated from a nanoindentation study comparing the modulus near the interface of a nanoindentation sample comprising a fresh rubber strip co-cured with a rubber strip modified by surface devulcanization in accordance with Example 1A of the disclosed subject matter.

With regard to the nanoindentation data presented in FIG. 4, area U indicates the previously un-vulcanized fresh rubber strip and area C represents the previously vulcanized Strip-0. The vertical line represents the interface between previously un-vulcanized fresh rubber strip and the previously vulcanized Strip-0. With regard to the nanoindentation data presented in FIG. 5, area U indicates the previously un-vulcanized fresh rubber strip and area C represents the previously vulcanized Strip-1 modified via surface devulcanization in accordance with Example 1A. The vertical line represents the interface between the previously un-vulcanized fresh rubber strip and the previously vulcanized Strip-1 with surface devulcanization in accordance with Example 1A.

As is shown by the results, the degree of curing on the two sides of the interface between respective strips for each of nanoindentation sample L-0 and nanoindentation sample L-1 is different. With reference to nanoindentation sample L-0 (FIG. 4), a region of low modulus is observed on the previously un-cured fresh rubber strip near the interface between the strip and Strip-0. It is postulated that the region of low modulus is likely due to diffusion of sulfur from the previously un-cured fresh rubber strip into Strip-0. The additional sulfur does not appear to result in an obvious over-cure of Strip-0 near the interface. In contrast, and with reference to the nanoindentation data for nanoindentation sample L-1 (FIG. 5), a region of high modulus occurred on the side of Strip-1 near the interface between the strip and the previously un-cured fresh rubber strip, indicating additional crosslinks generated by sulfur that diffused from the previously un-cured fresh rubber strip to Strip-1 near the interface and/or carbon black flocculation near the interface due to devulcanization.

As the studies of interfacial adhesion using rubber strips suggests, successful surface devulcanization is only a necessary condition to achieve optimal interfacial adhesion. Over-cure or other structural changes, such as carbon black flocculation, can occur at the interface between co-cured fresh rubber and vulcanized rubber with modification via surface devulcanization. It is proposed that such detrimental events near the interface between vulcanized rubber modified via surface devulcanization in accordance with Example 1A and fresh rubber upon co-curing can be alleviated by either modifying the surface devulcanization procedure, post surface-devulcanization treatment, or a combination of the two methods (See Example 2A and Example 3A below).

II. EXAMPLE 1B

Modified Ground Rubber Tensile Studies

In order to determine the effect of modification of vulcanized rubber via surface devulcanization similar to Example 1A above when mixed and cured with fresh rubber at a microscale, tensile studies were performed on samples of co-cured mixed ground fresh rubber and ground rubber particles modified in accordance with Example 1B, described below.

A master batch of fresh rubber was formulated with 100 phr butadiene rubber and 40 phr carbon black. A control sample ("sample C-R") was prepared by mixing 140 phr of the fresh rubber master batch, 2 phr stearic acid, 2 phr zinc oxide, 1.25 phr sulfur, and 0.83 TBBS with a Brabender 80 cm$^3$ mixer at a speed of 60 rpm and initial temperature of 50 degrees Celsius. A moving die rheometer (MDR 2000) was used to measure curing kinetics at 160 degrees Celsius. Curing was carried out at 160 degrees Celsius under 10 Ton pressure for the duration of 90 minutes ($t_{90}$) on a Dake Hydraulic Mod 4419 compression model. The cured sample was quenched in water.

A master batch of vulcanized rubber was prepared in accordance with Table 4 above. Vulcanized rubber from the master batch was ground into particles having a particle size of approximately 60 mesh or less, referred to herein as "ground rubber particles". More specifically, the ground rubber particles were prepared by cryogenic grinding vulcanized 6 inch×6 inch×0.4 inch thick plaques of the rubber compound shown in Table 4 from vulcanized 6 inch×6 inch×0.4 inch thick plaques and then passing the cryogenic ground particles through screens of different mesh sizes. The ground rubber particles used in these experiment were on average 0.30 mm in diameter. A portion of the ground rubber particles were in turn modified in accordance with Example 1B. More specifically, 15 grams of the ground rubber particles were added to a glass-fritted funnel capable of suction filtration. A solution of 1 M butylthiol in piperidine was added into the funnel. The ground rubber particles were allowed to dwell in the solution for 10 seconds before suction filtration was applied to remove the solution. The ground rubber particles were left in the funnel for 1 hour, and were then washed with 300 ml of toluene. After removal of excess toluene by filtration, the ground rubber particles were then dried in a vacuum oven at room temperature for 24 hours. The ground rubber particles modified in accordance with Example 1B above are designated as modified ground rubber-1 ("MGR-1") for purposes of this disclosure.

A sample C-0, consisting of ground rubber particle, fresh rubber, and curing agents with formulation concentrations according to Table 5 below and mixed and cured in accordance with the same equipment and curing procedure utilized to prepare sample C-R above, was prepared.

TABLE 5

Compounding procedure for standard and GR filled rubber compounds.

|  | C-R | C-0 | C-1 | C-2 | C-2' | C-3 | C-4 |
|---|---|---|---|---|---|---|---|
| Master batch | 140 | 116.67 | 116.67 | 116.67 | 116.67 | 116.67 | 116.67 |
| Unmodified GRP | 0 | 23.33 | 0 | 0 | 0 | 0 | 0 |
| MGR-1 | 0 | 0 | 23.33 | 0 | 0 | 0 | 0 |
| MGR-2 | 0 | 0 | 0 | 23.33 | 23.33 | 0 | 0 |
| MGR-3 | 0 | 0 | 0 | 0 | 0 | 23.33 | 0 |
| MGR-4 | 0 | 0 | 0 | 0 | 0 | 0 | 23.33 |
| Stearic acid | 2 | 1.67 | 1.67 | 1.67 | 1.67 | 1.67 | 1.67 |
| ZnO | 2 | 1.67 | 1.67 | 1.67 | 1.67 | 1.67 | 1.67 |
| Sulfur | 1.25 | 1.04 | 1.04 | 1.04 | 1.04 | 1.04 | 1.04 |
| TBBS | 0.83 | 0.69 | 0.69 | 0.69 | 0.69 | 0.69 | 0.69 |
| Piperidine | 0 | 0 | 0 | 0 | 2 | 0 | 0 |

A sample C-1, consisting of modified ground rubber-1, fresh rubber, and curing agents with formulation concentrations according to Table 5 above mixed and cured in accordance with the same equipment and curing procedure utilized to prepare sample C-R above, was prepared.

The cured sample C-R, sample C-0, and sample C-1, were cut in the milling direction of the cured sheets into ASTM D412 Type C dumbbells, in which the width of the narrow section of each dumbbell was approximately 6.35 mm and the thickness of each dumbbell was approximately 0.8 mm to 1.0 mm. The tensile properties of each sample C-R, sample C-0, and sample C-1 ASTM D412 Type C dumbbell were measured on an Intron Model 5567 equipped with a 1000 N load cell, with a crosshead speed of 500 mm/min with an initial gap of 65 mm. The strain of each of sample C-R, sample C-0, and sample C-1 ASTM D412 Type C dumbbell was measured with an extensometer at increasing levels of stress, as is indicated in FIG. 6.

Figure 6:
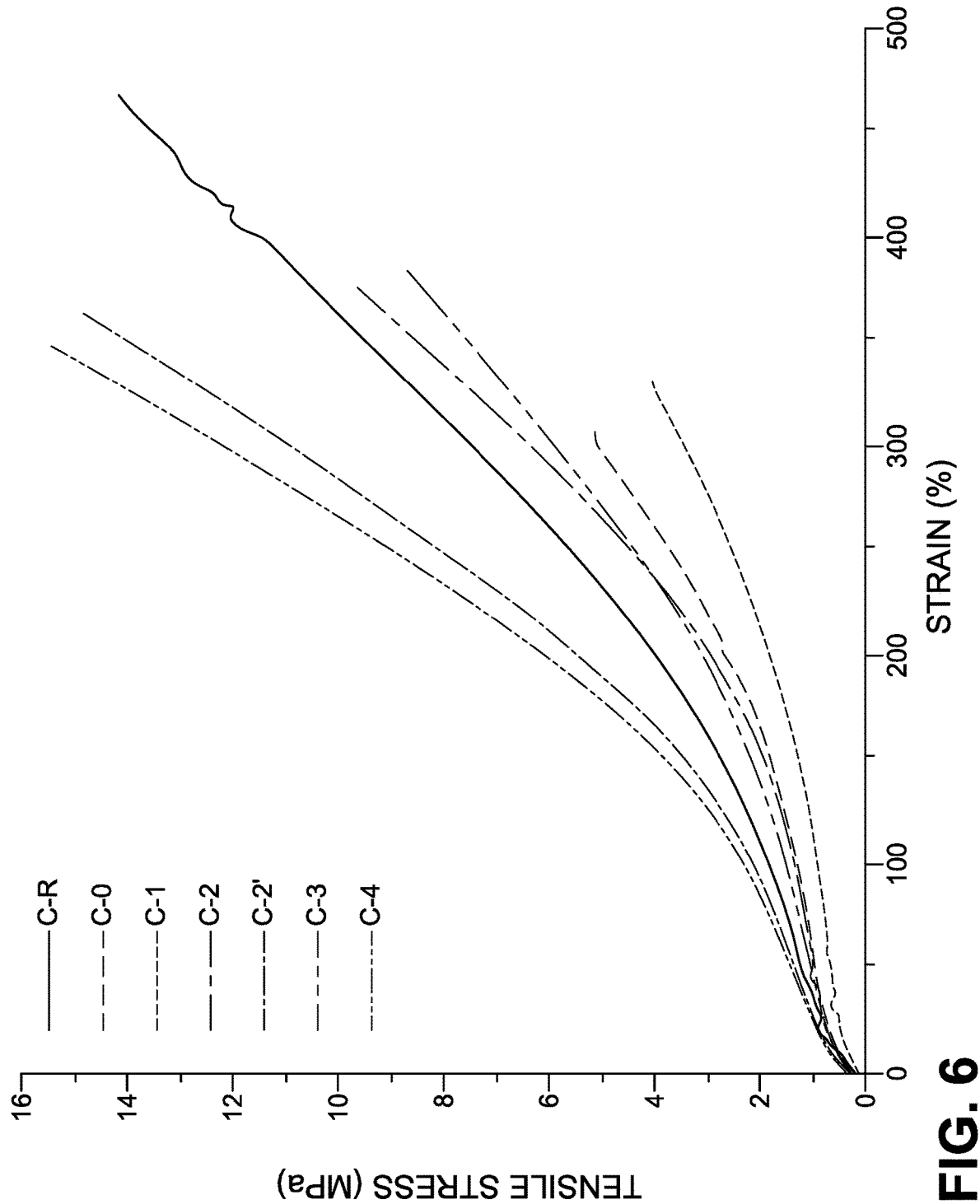
FIG. 6 is graph of results generated from Example 1B, Example 2B, Example 3B, and Example 4, representing tensile strength relative to percent strain for co-cured recycled rubber and fresh rubber compositions with and without various surface modifications via surface devulcanization of the ground rubber particles in accordance with the method of modifying devulcanized rubber of the disclosed subject matter.

As shown by the stress-strain results for sample C-0 indicated in FIG. 6, and as was expected, the material of sample C-0, consisting of co-cured ground fresh rubber and ground rubber particles, exhibited decreased performance compared to sample C-R, consisting of cured ground fresh rubber.

As shown by the stress-strain results for sample C-1 indicated in FIG. 6, when ground rubber particles are first modified via Example 1B (MGR-1) prior to mixing with ground fresh rubber and co-curing with the ground fresh rubber, the resulting material exhibited worse performance than sample C-R, and sample C-0. This is in contrast to the T-peel studies described above, in which sample L-1, that included a co-cured fresh rubber strip and vulcanized rubber strip modified in accordance with the method of Example 1A, exhibited greater adhesion and interfacial strength between the strips as compared to sample L, consisting of two co-cured fresh rubber strips, and sample L-1, consisting of a co-cured fresh rubber strip and vulcanized rubber strip. It is postulated that because of the relatively small particle size of the ground rubber particles treated in accordance with Example 1B, and the good penetrating ability of piperidine and butylthiol, that the interior of the ground rubber particles were actually devulcanized, as opposed to surface devulcanized. Consistent with this assessment, only sixty percent (60%) of the ground rubber by weight was recovered after treatment using the above described method. The remaining ground rubber was lost in the filtration step as the solute or colloidal suspension in piperidine and butylthiol. As shown in Table 6, elemental analysis reveals that the carbon (C), hydrogen (H), nitrogen (N), and sulfur (S) compositions of the nonvolatile residual in the solution phase are close to the compositions of the rubber compound minus carbon black, indicating that the elastic network is compromised and carbon black is retained in the ground rubber after the treatment with the 1:10 mixture of butylthiol and piperidine. As discussed above, deep devulcanization of previously vulcanized particles generally results in poor overall performance of rubber compounds containing previously vulcanized rubber particles. Because the high-modulus region observed by nanoindentation as described above in Example 1A is on the scale of millimeters, the interior part of the approximately 250 micron size rubber particles in sample C-1, as well as the interface between the ground rubber particles and the fresh rubber is likely altered. This alteration may include overcure, flocculation of carbon black, and/or loss of rubber content. Regardless of what nature the alteration is, an abrupt variation in modulus raises local stress and may promote fracture of the rubber.

TABLE 6

Elemental analysis results of nonvolatile residual in devulcanization solution.

|  | Carbon (%) | Hydrogen (%) | Nitrogen (%) | Sulfur (%) |
|---|---|---|---|---|
| Rubber compound | 89.53 | 7.83 | 0.07 | 1.00 |
| Rubber compound minus carbon black | 85.62 | 10.76 | 0.09 | 1.38 |
| Nonvolatile residual in solution | 85.67 | 11.25 | 0.24 | 1.19 |

Accordingly, Example 1B is not a true surface devulcanization procedure for ground rubber particles. Examples 2A/B/C and 3A/B describe improved procedures for selective surface devulcanization, as will be described below.

EXAMPLES 2A/B/C

Overview

Examples 2A/B/C generally includes treating recycled rubber compounds with a surface devulcanization agent(s), for example a catalyst, that causes the breakage of a significant fraction of the di- and polysulfidic crosslinks located near the surface of the recycled rubber. More specifically, Examples 2A/B/C generally include the steps of treating the recycled rubber with butylthiol and piperidine in acetone, washing the treated recycled rubber with acetone, and drying the washed recycled rubber to obtain a surface devulcanized recycled rubber compound. Because Acetone is a solvent in which the devulcanization agents can typically be dissolved, but yet does as little swelling of the recycled rubber as possible, Acetone does not generally transport the devulcanization agents into the recycled rubber. However, the devulcanization agents are free to absorb at the surface of the recycled rubber and may diffuse to some limited extent into the interior of the recycled rubber. More specifically, as acetone does not effectively penetrate, and thus only minimally swells certain vulcanized rubbers, such as styrene-butadiene rubber (SBR), poly-butadiene rubber (BR), and natural rubber (NR), and is capable of solubilizing certain devulcanization agents, it is postulated that by dissolving the devulcanization agents (i.e. piperidine and butylthiol) in acetone, the devulcanization will be limited generally to the surface of the vulcanized rubber. It should be understood that the method for recycling rubber described above could be carried out via a batch or continuous process, without changing the overall concept or operation of the disclosed subject matter.

While Examples 2A/B/C describe use of butylthiol and piperidine in acetone to achieve desired surface devulcanization of recycled rubber, it is by way of example. It is contemplated that thiols other than or in addition to butylthiol, such as methylthiol, ethylthiol, n-propylthiol, isopropylthiol, phenylthiol, tolythiol, (2-hydroxyethyl)thiol, (2-methoxyethyl)thiol, (2-ethoxyethyl)thiol, and the like, could be utilized in accordance with Examples 2A/B/C without affecting the overall concept or operation of the disclosed subject matter. Moreover, it is contemplated that bases other than or in addition to piperidine, such as triethylamine, diphenylguanidine, di-tolylguanidine, 1,8-diazabicyclo[5.4.0]undec-7-ene, pyridine, and the like, could be utilized in accordance with Examples 2A/B/C without affecting the overall concept or operation of the disclosed subject matter. It is also contemplated that other or additional devulcanization catalysts, such as disulfides, including dimethyl disulfide and diethyl disulfide, or mercaptobenzothiazole, with or without any useful co-catalysts, and the like, could be utilized in accordance with Examples 2A/B/C without affecting the overall concept or operation of the disclosed subject matter. It is even further contemplated that solvents other than acetone in which the selected surface devulcanization agents are soluble could be utilized in accordance with Examples 2A/B/C, such as other solvents or mixtures of solvents that do not effectively penetrate, and thus only minimally swell certain vulcanized rubbers, without affecting the overall concept or operation of the disclosed subject matter.

I. EXAMPLE 2A

Macroscale T-Peel Studies

To demonstrate the correlation between the degree of tackiness and adhesion on interfacial strength of recycled rubber treated in accordance with Example 2A, as indicated below, and fresh rubber, as well as the effectiveness of macroscale application of the method and feasibility of microscale application, macroscale T-peel studies were performed. In the macroscale T-peel studies, laminates of fresh rubber strips and vulcanized rubber strips were utilized to demonstrate both pre-co-curing physical adhesion between fresh rubber and vulcanized rubber treated in accordance with Example 2A, as indicated below, and adhesion/interfacial strength after co-curing. The formulation of the fresh rubber compounds and vulcanized rubber compounds and preparation of fresh rubber strips and vulcanized rubber strips (Strip(s)-0) utilized in the T-peel studies are shown in Table 4 and are described above with regard to Example 1A.

A vulcanized rubber strip prepared in accordance with above was treated according to Example 2A. Specifically, the vulcanized rubber strip was immersed in a solution of butylthiol and piperidine in acetone with a volume ratio of 1:20:100 for 1 hour. Because crosslinked polybutadiene does not generally effectively swell in acetone, only the surface of the strip was exposed to the devulcanization agents. The excess solution was gently wiped away with a paper towel. The vulcanized rubber strip was then wrapped in aluminum foil and placed in a covered petri dish at room temperature for 1 hour, and was then rinsed with fresh acetone and dried in a vacuum oven at room temperature. For purposes of this disclosure, the strip is designated as a strip treated in accordance with Example 2A or "Strip(s)-2". Once treated in accordance with Example 2A, Strip-2 exhibited a tacky surface, without affecting the overall integrity of the strip.

a. Physical Adhesion as a Result of Tackiness

To determine and demonstrate the degree of physical adhesion between vulcanized rubber treated in accordance with Example 2A and fresh rubber a sample L-2 was prepared by placing a 1.27 cm×2.54 cm Mylar film between a vulcanized rubber strip treated in accordance with Example 2A (Strip-2) and a fresh rubber strip.

Like sample L, sample L-0, and sample L-1 in Example 1A above, sample L-2 was placed in an aluminum mold with a window of the same dimensions as the samples. The mold was then placed in a Dake Hydraulic Mod 4419 press under 0.5 Ton of pressure for 24 hours at room temperature. After release of the pressure, sample L-2 was allowed to rest at ambient pressure until testing. The Mylar film was removed from sample L-2. A T-peel test was then performed on sample L-2 utilizing an Instron Model 5567 tensile tester equipped with a 1000 N load cell, with a crosshead speed set at 50.8 mm/min. Sample L-2 was stretched until the respective fresh and vulcanized strip completely separated. The peeling strength or peeling force was calculated by dividing the force detected by the width of the specimen and the fracture energy was calculated by multiplying the peeling strength by the distance. The result is indicated in FIG. 2.

As shown in FIG. 2, and described above, the average peeling force to separate the two fresh rubber strips of sample L is approximately 0.78 N/mm. The average peeling force to separate the co-cured vulcanized rubber strip and the co-cured fresh rubber strip of sample L-0 is approximately 0.38 N/mm. In comparison, the average peeling force to separate the fresh rubber strip and the vulcanized rubber strip modified via surface devulcanization in accordance with Example 2A of sample L-2 is approximately 1.45 N/mm, similar to that of sample L-1, nearly double the force required to separate the fresh rubber strips of sample L, and approximately four times the force required to separate the vulcanized rubber strip and the fresh rubber strip of sample L-0.

As is shown by the data provided by the physical adhesion results in FIG. 2, when a vulcanized rubber strip is modified by surface devulcanization in accordance with Example 2A, the tackiness exhibited by the surface of the treated vulcanized rubber strip promotes a strong interface between the fresh rubber strip due to physical adhesion.

b. Interfacial Strength After Co-Curing of Laminates

To determine and demonstrate the effects that increased pre-vulcanization physical adhesion and selective surface devulcanization have on interfacial strength upon subsequent co-curing or vulcanization at a macroscale level, and thus the feasibility of utilizing Example 2A at a microscale, e.g. with ground vulcanized rubber, T-peel studies were performed on co-cured laminates of fresh rubber and vulcanized rubber modified in accordance with Example 2A.

A sample L-2 was prepared in accordance with above. Sample L-2 was placed in an aluminum mold with a window of the same dimensions as the sample. The mold was then placed in a Dake Hydraulic Mod 4419 press under 0.5 Ton of pressure at 150 degrees Celsius for 25 minutes to co-cure the respective sample laminates. The Mylar film was removed from cured sample L-2. A T-peel test was then performed on cured sample L-2 utilizing an Instron Model 5567 tensile tester equipped with a 1000 N load cell, with a crosshead speed set at 50.8 mm/min. Cured sample L-2 was stretched until the previously uncured fresh rubber strip and vulcanized strip completely separated. The peeling strength or peeling force was calculated by dividing the force detected by the width of the specimen and the fracture energy was calculated by multiplying the peeling strength by the distance. The result is indicated in FIG. 3.

As shown in FIG. 3, and indicated above, the average peeling force to separate the two co-cured fresh rubber strips of sample L is approximately 14.7 N/mm. The average peeling force to separate the co-cured vulcanized rubber strip and the fresh rubber strip of sample L-0 is approximately 1.48 N/mm. In comparison, the average peeling force to separate the co-cured fresh rubber strip and the vulcanized rubber strip modified via surface devulcanization in accordance with Example 2A of sample L-2 is approximately 14.9 N/mm, or approximately ten times the peeling force required to separate co-cured fresh rubber and vulcanized rubber strips (sample L-0), and approximately equal to the force required to separate the two co-cured fresh rubber strips of sample L. Thus, at a macroscale, when the surface of the vulcanized rubber is modified via selective surface devulcanization according to Example 2A, there is a significant increase in interfacial strength between the vulcanized rubber and fresh rubber.

Comparison of the data from T-peel studies performed on un-cured sample L, sample L-0, and sample L-2 (FIG. 2) to T-peel studies performed on co-cured sample L, cured sample L-0, and cured sample L-2 (FIG. 3) generally supports that increased physical adhesion between fresh rubber and vulcanized rubber via increased tack between the rubbers by modification of the vulcanized rubber via surface devulcanization in accordance with Example 2A increases interfacial strength upon co-curing or vulcanization. Furthermore, compared to sample L-1 of Example 1A, sample L-2 provides greater interfacial strength upon co-curing or vulcanization with fresh rubber. It is postulated that the devulcanization in sample L-2 surface devulcanized in accordance with Example 2A is more localized to the surface of the vulcanized rubber than that in sample L-1 surface devulcanized in accordance with Example 1A.

c. Nanoindentation Study

To understand the method in Example 2 for devulcanization of rubber with respect to its surface selectivity, nanoindentation studies were carried out. The nanoindentation experiments were carried out in the same manner described in Example 1.

Figure 7:
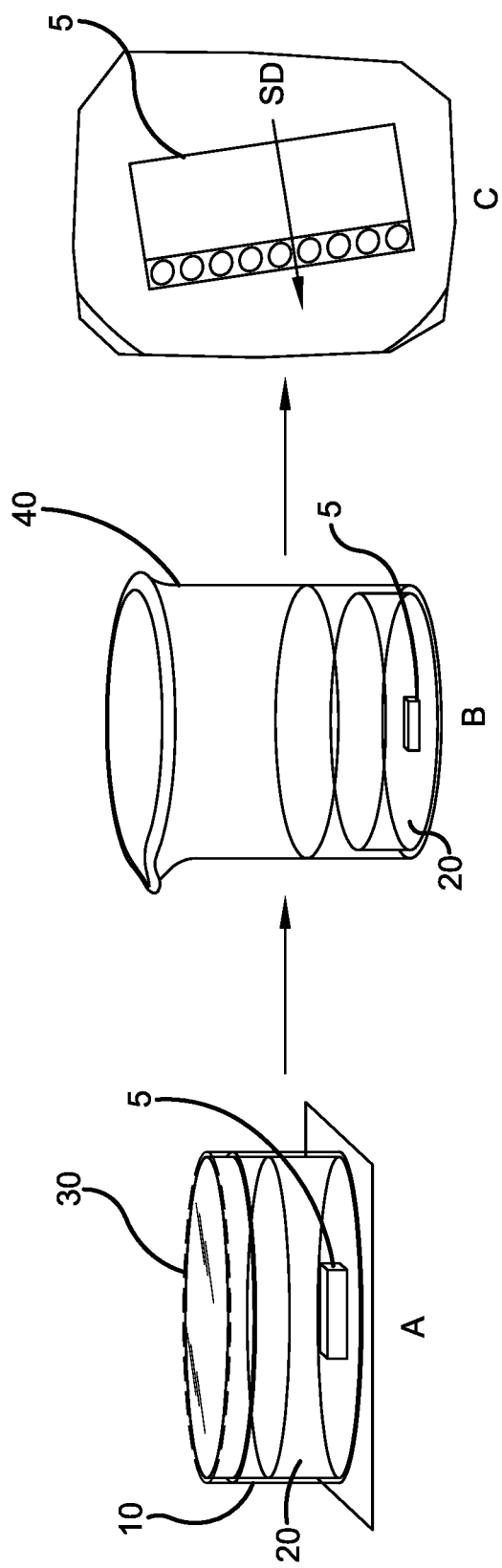
FIG. 7 is an illustration depicting the preparation steps of the nanoindentation sample of Strip-2.

A nanoindentation sample of L-2 was prepared the same way as the sample of L-1 described in Example 1. A nanoindentation study of a nanoindentation sample comprising a single Strip-2, referenced hereinafter as "strip 5" (FIG. 7), and not the laminate, was performed to probe the depth and extent of surface devulcanization. The nanoindentation sample of strip 5 was prepared in the following manner and is illustrated in FIG. 7. The surface of strip 5 was not buffed. One side of strip 5 was taped with scotch tape. The other sides of strip 5 were embedded in epoxy resin contained in a stainless steel ring 10 and covered with a Teflon® film 30 (Step A). After allowing the epoxy resin to cure at room temperature for two days, an epoxy resin block 20 in which strip 5 was embedded was removed from stainless steel ring 10. The scotch tape was removed from strip 5. Strip 5 embedded in epoxy resin block 20 was treated with the solution of butylthiol and piperidine in acetone with a volume ratio of 1:10:100 (50 mL) via submersion of the strip in the solution within a beaker 40 for different periods of time at room temperature (Step B). Strip 5 was then removed from epoxy resin block 20 and pumped down at room temperature to remove residual solvent. The surface of strip 5 was cleaned by compressed air. Strip 5 was cross-sectioned for the nanoindentation study and was scanned in a scan direction SD (Step C).

Figure 8A:
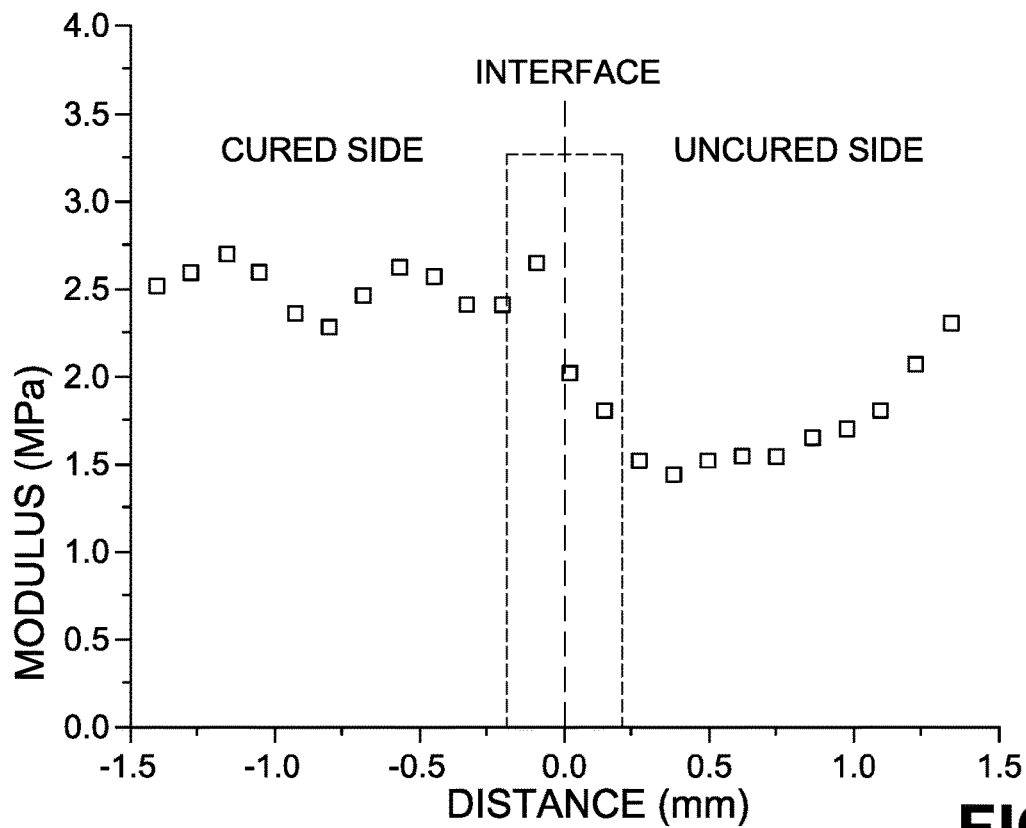
FIG. 8A is a graph of results generated from the nanoindentation study of the nanoindentation sample of sample L-2 of the disclosed subject matter with low spatial resolution.
Figure 8B:
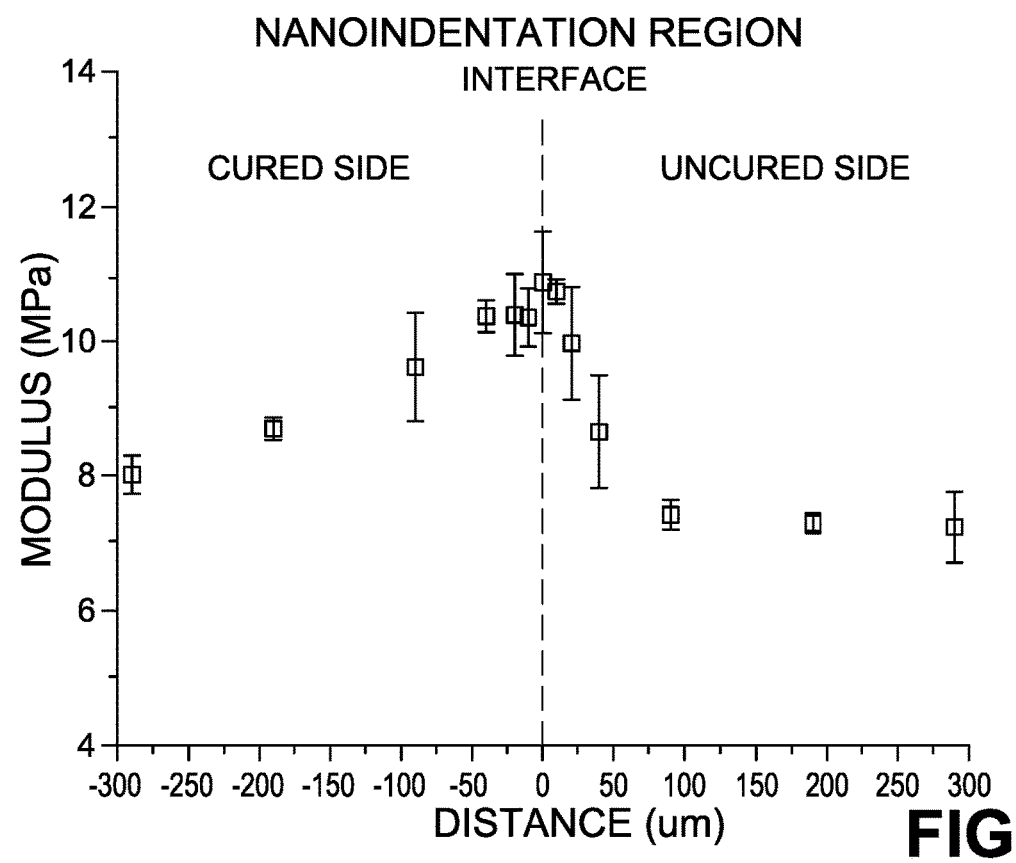
FIG. 8B is a graph of results generated from the nanoindentation study of the nanoindentation sample of sample L-2 with high spatial resolution.

With reference to FIGS. 8A-8B, nanoindentation study of sample L-2 at a low spatial resolution (FIG. 8A) indicates that a low modulus region near the interface on the side that is uncured before co-curing of the laminate remains as expected due to diffusion of sulfur into the cured side. However, a high modulus region observed for co-cured sample L-1 (FIG. 8B) is not obviously present. The data of nanoindentation at a high spatial resolution reveals that a region with relatively high modulus near the interface on the pre-cured side remains. Overall, the high modulus region in sample L-2 does exist, but is much less pronounced than that in sample L-1.

Figure 9A:
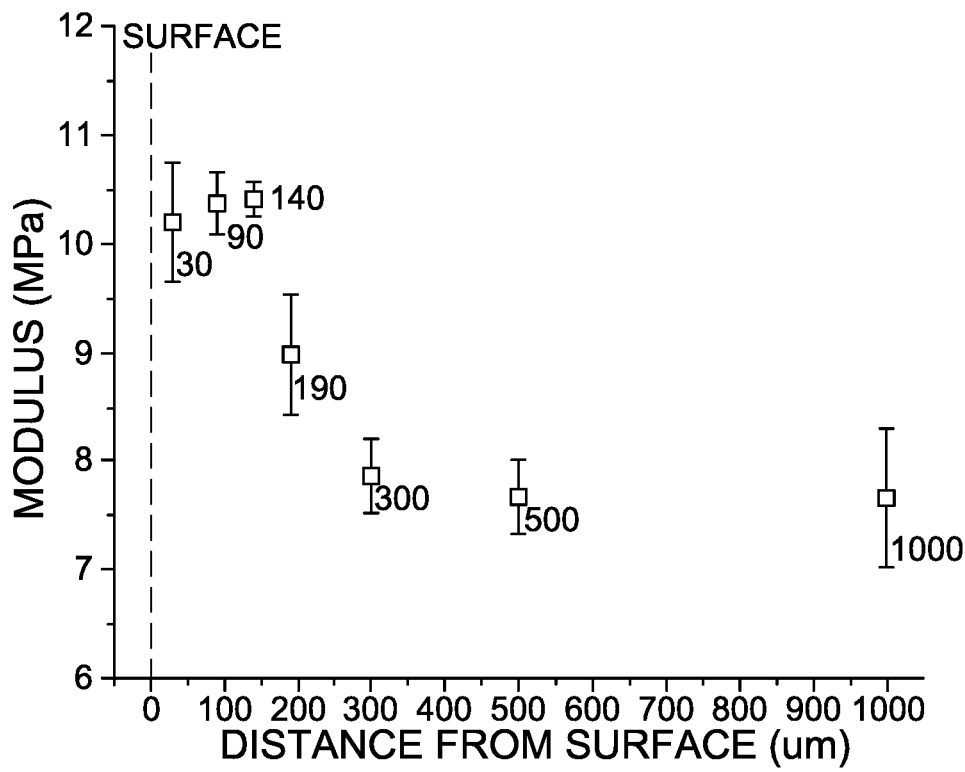
FIG. 9A is a graph of results generated from the nanoindentation study of the nanoindentation sample of Strip-2 of the disclosed subject matter prepared as shown in FIG. 7.
Figure 9B:
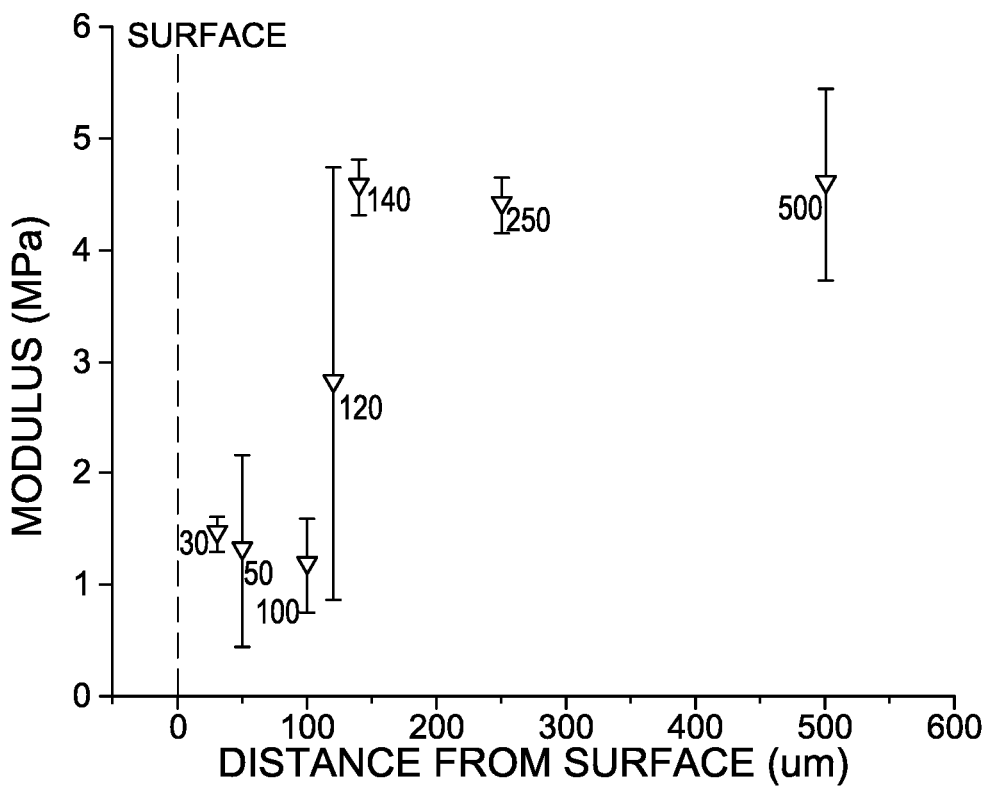
FIG. 9B is a graph of results generated from the nanoindentation study of a nanoindentation sample of Strip-2 prepared without the addition of carbon black.

Nanoindentation study of the single Strip-2 was carried out to understand the surface devulcanization process. As shown in FIG. 9A, after the surface treatment, a high modulus region near the surface of Strip-2 is unexpectedly observed. It is postulated that the modulus increase near the surface of Strip-2 is attributable to carbon black flocculation. In support of this assessment, nanoindentation of a surface-devulcanized Strip-2 prepared without the addition of carbon black, resulted in the anticipated decrease of modulus (FIG. 9B). Both experiments indicate that the depth of devulcanization is on the order of approximately 100 μm. As a result, it is preferable that the depth of devulcanization be limited to about 100 μm or less. Such limited surface devulcanization can be achieved generally by dissolving the devulcanization agents in a solvent that is capable of solubilizing the agents, but does not effectively penetrate and only minimally swells the vulcanized rubber, and thus does not transport the agents to a depth greater than 100 μm from the surface of the vulcanized rubber. For example, devulcanization depth can be limited to 100 μm or less by treating recycled rubber with devulcanization agents butylthiol and piperidine in acetone, as acetone is a solvent that does not effectively penetrate, and thus only minimally swells certain vulcanized rubbers. In addition, it is also contemplated that the devulcanization depth can be limited to a depth that is less than 100 μm and which provides optimum recycling performance of the surface-devulcanized rubber by modifying the devulcanization agents, such as utilizing a catalyst or a base, in a manner that limits or slows diffusion of the agents into the recycled rubber matrix when dissolved in a solvent that does not effectively penetrate, and thus only minimally swells certain vulcanized rubbers, such as acetone. Such modifications to the devulcanization agent could include chemical or structural changes, or a combination of both, made to the agents that promote physical or chemical interference of the rubber matrix with the agents and/or that changes the solubility of the agents within the rubber matrix to effectively limit diffusion of the agents to a depth that is less than 100 µm and thus provides optimum recycling performance of the surface-devulcanized rubber. For example, side chains could be added to the devulcanization agents, such that the recycled rubber matrix causes physical interference with the modified agents to slow diffusion of the agents within the matrix.

Figure 10:
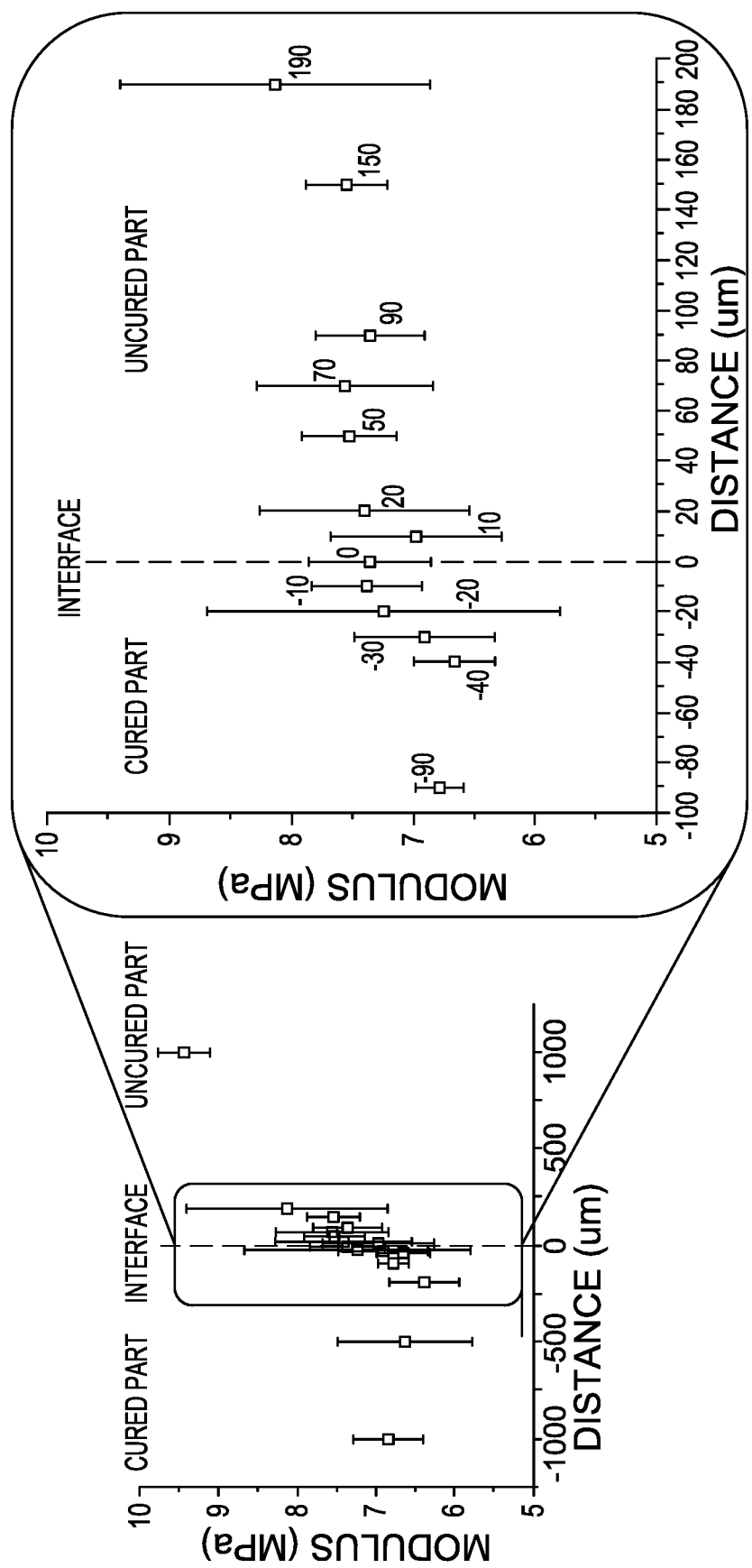
FIG. 10 is a graph of results generated from the nanoindentation study of the nanoindentation sample of sample L-2 that includes 2 phr of piperidine added in accordance with the disclosed subject matter.

As discussed above, the low modulus region on the uncured side is caused by diffusion of sulfur from the uncured side to the cured side. This problem can be eliminated or at least be alleviated by addition of piperidine in the rubber to accelerate the co-cure so that an increased amount of sulfur will be fixed on the uncured side by the reaction of vulcanization before having the time to diffuse into the cured side. Indeed, as shown in FIG. 10, nanoindentation study of sample L-2 containing 2 phr of added piperidine shows a step profile of modulus near the interface.

II. EXAMPLE 2B

Modified Ground Rubber Tensile Studies

In order to determine the effect of selective surface modification of vulcanized rubber via selective surface devulcanization similar to Example 2A above when mixed and cured with fresh rubber at a microscale, tensile studies were performed on samples of co-cured mixed ground fresh rubber and ground rubber particles modified in accordance with Example 2B, described below.

A portion of the ground rubber particles prepared in accordance with Example 1B above were modified in accordance with Example 2B. More specifically, 15 grams of the ground rubber particles were added to a glass-fritted funnel capable of suction filtration. A solution of butylthiol and piperidine in acetone with a volume ratio of 1:10:100 (100 ml) was added into the funnel. The ground rubber particles were allowed to dwell in the solution for 1 hour before suction filtration was applied to remove the solution. The ground rubber particles were left in the funnel for 1 hour, and were then washed with 300 ml of acetone. The ground rubber particles were then dried in a vacuum oven at room temperature for 24 hours. The ground rubber particles modified in accordance with Example 2B above are designated as modified ground rubber-2 ("MGR-2") for purposes of this disclosure.

A sample C-2, consisting of modified ground rubber-2, fresh rubber, and curing agents with formulation concentrations according to Table 5 above were mixed and cured in accordance with the same equipment and curing procedure utilized to prepare sample C-R in Example 1B.

The cured sample C-2 was cut in the milling direction of the cured sheet into a ASTM D412 Type C dumbbell, in which the width of the narrow section of the dumbbell was approximately 6.35 mm and the thickness of the dumbbell was approximately 0.8 mm to 1.0 mm. The tensile properties of sample C-1 ASTM D412 Type C dumbbell were measured on an Intron Model 5567 equipped with a 1000 N load cell, with a crosshead speed of 500 mm/min with an initial gap of 65 mm. The strain sample C-2 ASTM D412 Type C dumbbell was measured with an extensometer at increasing levels of stress, as is indicated in FIG. 6.

As is shown in FIG. 6, sample C-2 is considerably stronger and more extensible than sample C-0 and sample C-1. This indicates that selective surface devulcanization and control of the amount of the residual piperidine after surface devulcanization are important factors contributing to the interfacial strength between co-cured fresh rubber and vulcanized rubber. As evidence for the assessment that the interior of the ground rubber particles modified by the method in Example 2B is largely preserved, less than two percent (2%) weight loss of the ground rubber is observed after the treatment. Moreover, the color of the acetone solution after filtration was light tan, indicating that a substantial amount of carbon black was not lost after modification. With reference to Table 7 below, elemental analysis of the minute amount of nonvolatile residual in the acetone solution reveals high nitrogen (N) and sulfur (S) concentrations, indicating that the nonvolatile residual is composed of the products of reactions involving piperidine and butylthiol. Sample C-2 provides still somewhat less interfacial strength between the co-cured fresh rubber and vulcanized rubber than sample C-R. It is postulated that this results from an overcured or undercured interface between the co-cured fresh rubber and vulcanized rubber. Examples 3A/B further illustrates the importance of controlling the degree of interface cure between co-cured fresh rubber and surface vulcanized rubber modified by selective surface devulcanization, as is described below.

TABLE 7

Elemental analysis results of nonvolatile residual in devulcanization solution.

| | Carbon (%) | Hydrogen (%) | Nitrogen (%) | Sulfur (%) |
| --- | --- | --- | --- | --- |
| Rubber compound | 89.53 | 7.83 | 0.07 | 1.00 |
| Rubber compound minus carbon black | 85.62 | 10.76 | 0.09 | 1.38 |
| Nonvolatile residual in solution | 66.20 | 11.08 | 4.12 | 4.60 |

III. EXAMPLE 2C

Modified Ground Rubber Tensile Studies with Additional Piperidine

Nanoindentation studies in Example 2A reveal that addition of piperidine into sample L-2 can eliminate the low modulus region on the uncured side by preventing sulfur from being diffused into the cured side. To demonstrate this finding on a micro scale, piperidine (2 phr) was added to sample C-2 on two-roll mill along with other curative to prepare a rubber composite sample C-2'. Except for the addition of the 2 phr piperidine, sample C-2' is otherwise identical to sample C-2.

The cured sample C-2' was cut in the milling direction of the cured sheet into a ASTM D412 Type C dumbbell, in which the width of the narrow section of the dumbbell was approximately 6.35 mm and the thickness of the dumbbell was approximately 0.8 mm to 1.0 mm. The tensile properties of sample C-2' ASTM D412 Type C dumbbell were measured on an Intron Model 5567 equipped with a 1000 N load cell, with a crosshead speed of 500 mm/min with an initial gap of 65 mm. The strain of sample C-2' ASTM D412 Type C dumbbell was measured with an extensometer at increasing levels of stress, as is indicated in FIG. 6.

As shown by the stress-strain results in FIG. 6, sample C-2' exhibited higher tensile strength and modulus than sample C-R. It is postulated that the low modulus region on the fresh rubber side at the interface is avoided or alleviated by the addition of piperidine. Thus, the modulus contrast at the interface is reduced. More particularly, the modulus differences at the interface between the ground rubber particles and fresh rubbers upon co-curing of the ground rubber particles and ground fresh rubber are reduced.

EXAMPLES 3A/B

Overview

Examples 3A/B generally include treating recycled rubber compounds with a surface devulcanization agent(s) that causes the breakage of a significant fraction of the di- and polysulfidic crosslinks located near the surface of the recycled rubber. More specifically, Examples 3A/B generally include the steps of immersing the recycled rubber in a solution of butylthiol in Ethanol in a Parr high-pressure reactor and heating at 150 degrees Celsius for 24 hours, rinsing the treated recycled rubber with ethanol, and drying the rinsed recycled rubber to obtain a surface devulcanized recycled rubber compound. Because butylthiol is miscible with ethanol, it is expected to preferentially stay in the ethanol phase rather than in the recycled rubber. Thus, devulcanization in the recycled rubber interior is prevented, and selective surface devulcanization is achieved. Also, thermal treatment in the absence of a catalyst, such as piperidine, ensures that no residual catalyst will be left in the surface devulcanized recycled rubber and prevents unexpected and possibly adverse effects on the interfacial strength between co-cured fresh rubber and vulcanized rubber from the residual catalyst.

I. EXAMPLE 3A

Macroscale T-Peel Studies

To demonstrate the correlation between the degree of tackiness and adhesion on interfacial strength of recycled rubber treated in accordance with Example 3A, as indicated below, and fresh rubber, as well as the effectiveness of macroscale application of the method and feasibility of microscale application, macroscale T-peel studies were performed. In the macroscale T-peel studies, laminates of fresh rubber strips and vulcanized rubber strips were utilized to demonstrate both pre-co-curing physical adhesion between fresh rubber and vulcanized rubber treated in accordance with Example 3A, as indicated below, and adhesion/interfacial strength after co-curing. The formulation of the fresh rubber compounds and vulcanized rubber compounds and preparation of fresh rubber strips and vulcanized rubber strips (Strip(s)-0) utilized in the T-peel studies are shown in Table 4 and are described above with regard to Example 1A.

A vulcanized rubber strip prepared in accordance with the above method was treated according to Example 3A. Specifically, the vulcanized rubber strip was immersed into a solution of butylthiol in ethanol with a volume ratio of 1:20 in a Parr high-pressure reactor. The reactor was heated to 150 degrees Celsius for 24 hours. Because crosslinked polybutadiene does not effectively swell in ethanol, only the surface of the strip was exposed to the devulcanization agents. The strip was taken out of the reactor and was allowed to cool to room temperature. The strip was then rinsed with fresh ethanol and dried in a vacuum oven at room temperature. For purposes of this disclosure, the strip is designated as a strip treated in accordance with Example 3A or "Strip(s)-3". Once treated in accordance with Example 3A, Strip-3 exhibited a tacky surface, without affecting the overall integrity of the strip.

a. Physical Adhesion as a Result of Tackiness

To determine and demonstrate the degree of physical adhesion between vulcanized rubber treated in accordance with Example 3A and fresh rubber, a sample L-3 was prepared by placing a 1.27 cm×2.54 cm Mylar film between a vulcanized rubber strip treated in accordance with Example 3A (Strip-2) and a fresh rubber strip.

Like sample L, sample L-0, sample L-1 in Example 1A, and sample L-2 in Example 2A above, sample L-3 was placed in an aluminum mold with a window of the same dimensions as the samples. The mold was then placed in a Dake Hydraulic Mod 4419 press under 0.5 Ton of pressure for 24 hours at room temperature. After release of the pressure, sample L-3 was allowed to rest at ambient pressure until testing. The Mylar film was removed from sample L-3. A T-peel test was then performed on sample L-3 utilizing an Instron Model 5567 tensile tester equipped with a 1000 N load cell, with a crosshead speed set at 50.8 mm/min. Sample L-3 was stretched until the respective fresh and vulcanized strip completely separated. The peeling strength or peeling force was calculated by dividing the force detected by the width of the specimen and the fracture energy was calculated by multiplying the peeling strength by the distance. The result is indicated in FIG. 2.

As shown in FIG. 2, and described above, the average peeling force to separate the two fresh rubber strips of sample L is approximately 0.78 N/mm. The average peeling force to separate the vulcanized rubber strip and the fresh rubber strip of sample L-0 is approximately 0.38 N/mm. In comparison, the average peeling force required to separate the fresh rubber strip and the vulcanized rubber strip modified via surface devulcanization in accordance with Example 3A of sample L-3 is approximately 1.65 N/mm, similar to that of sample L-1, nearly double the force required to separate the fresh rubber strips of sample L, and approximately four times the force required to separate the vulcanized rubber strip and the fresh rubber strip of sample L-0.

b. Interfacial Strength After Co-Curing of Laminates

To determine and demonstrate the effect of residual piperidine or absence thereof on co-curing or vulcanization at a macroscale level after enhanced physical adhesion was achieved by surface devulcanization in accordance with Example 3A, and thus the feasibility of utilizing Example 3A at a microscale, e.g. with ground vulcanized rubber, T-peel studies were performed on co-cured laminates of fresh rubber and vulcanized rubber modified in accordance with Example 3A.

A sample L-3 was prepared in accordance with above. Sample L-3 was placed in an aluminum mold with a window of the same dimensions as the sample. The mold was then placed in a Dake Hydraulic Mod 4419 press under 0.5 Ton of pressure at 150 degrees Celsius for 25 minutes to co-cure the respective sample laminates. The Mylar film was removed from cured sample L-3. A T-peel test was then performed on cured sample L-3 utilizing an Instron Model 5567 tensile tester equipped with a 1000 N load cell, with a crosshead speed set at 50.8 mm/min. Cured sample L-3 was stretched until the previously uncured fresh rubber strip and vulcanized strip completely separated. The peeling strength or peeling force was calculated by dividing the force detected by the width of the specimen and the fracture energy was calculated by multiplying the peeling strength by the distance. The result is indicated in FIG. 3.

As shown in FIG. 3, and indicated above, the average peeling force to separate the two co-cured fresh rubber strips of sample L is approximately 14.7 N/mm. The average peeling force to separate the co-cured vulcanized rubber strip and the fresh rubber strip of sample L-0 is approximately 1.48 N/mm. In comparison, the average peeling force to separate the co-cured fresh rubber strip and the vulcanized rubber strip modified via surface devulcanization in accordance with Example 3A of sample L-3 is approximately 1.65 N/mm, or approximately equal to the peeling force required to separate co-cured fresh rubber and vulcanized rubber strips (sample L-0), and approximately 11 percent (%) of the force required to separate the two co-cured fresh rubber strips of sample L. Thus, at a macroscale, when the surface of the vulcanized rubber is modified via surface devulcanization according to Example 3A, there is relatively weak interfacial strength between the vulcanized rubber and fresh rubber.

It was observed that after the two strips of sample L-3 were separated, the surface of Strip-3 modified in accordance with Example 3A remained tacky, indicating that the interface on the side of Strip-3 was not cured or was undercured upon co-curing with the fresh rubber strip. It is postulated that the absence of piperidine or other promoting agents in vulcanized rubber treated in accordance with Example 3A resulted in no cure or undercure at the interface between the co-cured vulcanized rubber and fresh rubber. Conversely, too great of a concentration of piperidine, or other promoting agents, present in the vulcanized rubber prior to co-curing with fresh rubber also results in overcure at the interface between the co-cured vulcanized rubber and fresh rubber, as is likely to be the case in the sample L-1. Thus, the amount of piperidine or other promoting agents present in the treated vulcanized rubber prior to co-curing with fresh rubber is likely critical for ensuring optimal interfacial bonding.

II. EXAMPLE 3B

Modified Ground Rubber Tensile Studies

In order to determine the effect of modification of vulcanized rubber via surface devulcanization similar to Example 3A above when mixed and cured with fresh rubber at a microscale, tensile studies were performed on samples of co-cured mixed ground fresh rubber and ground rubber particles modified in accordance with Example 3B, described below.

A portion of the ground rubber particles prepared in accordance with Example 1B above were modified in accordance with Example 3B. More specifically, 15 grams of the ground rubber particles were suspended in a solution of butylthiol in ethanol with a volume ratio of 1:20 (100 ml) in a Parr high-pressure reactor. The reactor was heated to 150 degrees Celsius for 12 hours. The solution was removed from the ground rubber particles via suction filtration. The ground rubber particles were then washed with 100 ml of ethanol and dried in a vacuum oven at room temperature for 24 hours. The ground rubber particles modified in accordance with Example 3B above are designated as modified ground rubber-3 ("MGR-3") for purposes of this disclosure.

A sample C-3, consisting of modified ground rubber-3, fresh rubber, and curing agents with formulation concentrations according to Table 5 above were mixed and cured in accordance with the same equipment and curing procedure utilized to prepare sample C-R in Example 1B.

The cured sample C-3 was cut in the milling direction of the cured sheet into a ASTM D412 Type C dumbbell, in which the width of the narrow section of the dumbbell was approximately 6.35 mm and the thickness of the dumbbell was approximately 0.8 mm to 1.0 mm. The tensile properties of sample C-3 ASTM D412 Type C dumbbell were measured on an Intron Model 5567 equipped with a 1000 N load cell, with a crosshead speed of 500 mm/min with an initial gap of 65 mm. The strain sample C-3 ASTM D412 Type C dumbbell was measured with an extensometer at increasing levels of stress, as is indicated in FIG. 6.

As shown by the stress-strain results for sample C-3 indicated in FIG. 6, when ground rubber particles are first modified via Example 3B (MGR-3) prior to mixing with ground fresh rubber and co-curing with the ground fresh rubber, the resulting material exhibited worse performance than sample C-R, but much better performance than sample C-1 of Example 1B, and substantially better performance than sample C-0. Thus, the ground rubber particles treated in accordance with Example 3B performed better than interiorly devulcanized rubber particles, as in Example 1B. However, because the interface between the co-cured fresh rubber and vulcanized rubber modified via Example 3B is not cured or undercured, sample C-3 provides decreased performance compared to sample C-R.

EXAMPLE 4

Post Modification Treatment of Modified Ground Rubber and Tensile Studies

Because the likely explanation for the difference between interfacial strength between the co-cured surface devulcanized ground rubber and fresh rubber in sample C-3 and the co-cured ground fresh rubber of sample C-R is an undercured interface between the co-cured surface-devulcanized ground rubber and fresh rubber, a simple post-surface devulcanization treatment for ground rubber particles first modified via Example 3B (MGR-3) was implemented. Specifically, 15 g of MGR-3 was placed in a 100 ml flask, and 2 ml of piperidine was added into the flask. The flask was sealed to allow adsorption of the piperidine by the MGR-3 to equilibrium. The MGR-3 after such treatment are designated as modified ground rubber-4 ("MGR-4") for purposes of this disclosure.

A sample C-4, consisting of MGR-4, fresh rubber, and curing agents with formulation concentrations according to Table 5 above were mixed and cured in accordance with the same equipment and curing procedure utilized to prepare sample C-R in Example 1B.

The cured sample C-4 was cut in the milling direction of the cured sheet into a ASTM D412 Type C dumbbell, in which the width of the narrow section of the dumbbell was approximately 6.35 mm and the thickness of the dumbbell was approximately 0.8 mm to 1.0 mm. The tensile properties of sample C-3 ASTM D412 Type C dumbbell were measured on an Intron Model 5567 equipped with a 1000 N load cell, with a crosshead speed of 500 mm/min with an initial gap of 65 mm. The strain of sample C-3 ASTM D412 Type C dumbbell was measured with an extensometer at increasing levels of stress, as is indicated in FIG. 6.

As shown by the stress-strain results for sample C-4 indicated in FIG. 6, when ground rubber particles are first modified via Example 4 (MGR-4) prior to mixing with ground fresh rubber and co-curing with the ground fresh rubber, the resulting material exhibited higher tensile strength and modulus than sample C-R. It is postulated that the undercure at the interface is avoided by the addition of piperidine. Also, like the piperidine added into the entire compound in the case of Example 2C, the piperidine added into the ground rubber particles can also reduce the modulus contrast and promote modulus uniformity at the interface of fresh rubber and ground rubber particles upon diffusion into the fresh rubber by fixing the sulfur that would otherwise have diffused into the ground rubber particles.

Unlike Examples 1B and 3B, because Example 4 provides optimal interfacial bonding between co-cured vulcanized ground rubber and fresh rubber and avoids devulcanization of the interior of ground rubber particles, the vulcanized rubber modified in accordance with Example 4 can be utilized in microscale applications, such as to modify ground rubber particles for curing with ground fresh rubber for use in high performance products, such as tires.

EXAMPLE 5

Modified SBR Ground Rubber Tensile Studies

In order to determine whether the methods demonstrated in Example 1-4 using butadiene rubber apply to styrene-butadiene rubber (SBR), modification of vulcanized SBR via surface devulcanization similar to Example 2B was performed. The resultant particles were mixed and cured with fresh rubber (SBR) at a microscale. Tensile studies were performed on samples of co-cured mixed fresh rubber (SBR) and ground SBR particles modified in accordance with Example 2B, described below.

A master batch of fresh rubber was formulated with 100 phr SBR and 40 phr carbon black. A control sample ("sample C-R-2") was prepared by mixing 140 phr of the fresh rubber master batch, 2 phr stearic acid, 2 phr zinc oxide, 1.25 sulfur, and 0.83 TBBS with a Brabender 80 cm$^3$ mixer at a speed of 60 rpm and initial temperature of 50 degrees Celsius. A moving die rheometer (MDR 2000) was used to measure curing kinetics at 160 degrees Celsius. Curing was carried out at 160 degrees Celsius under 10 Ton pressure for the duration of 90 minutes ($t_{90}$) on a Dake Hydraulic Mod 4419 compression model. The cured sample was quenched in water.

A master batch of vulcanized rubber was prepared in accordance with Table 4 above, but with SBR instead of butadiene rubber. Vulcanized rubber from the master batch was ground into particles having a particle size of approximately 60 mesh or less, referred to herein as "ground SBR particles".

More specifically, 15 grams of the ground SBR particles were added to a glass-fritted funnel capable of suction filtration. A solution of butylthiol and piperidine in acetone with a volume ratio of 1:10:100 (100 ml) was added into the funnel. The ground SBR particles were allowed to dwell in the solution for 1 hour before suction filtration was applied to remove the solution. The ground SBR particles were left in the funnel for 1 hour, and were then washed with 300 ml of acetone. The ground SBR particles were then dried in a vacuum oven at room temperature for 24 hours. The ground SBR particles modified in accordance with Example 5 above are designated as modified ground rubber-5 ("MGR-5") for purposes of this disclosure.

A sample C-0-2, consisting of the above unmodified ground SBR particles, fresh rubber (SBR), and curing agents with formulation concentrations according to Table 8 below and mixed and cured in accordance with the same equipment and curing procedure utilized to prepare sample C-R-2 above, was prepared.

TABLE 8

Compounding procedure for standard and GR filled rubber compounds.

| | C-R-2 | C-0-2 | C-5 | C-R-3 | C-0-3 | C-6 |
|---|---|---|---|---|---|---|
| SBR Master batch | 140 | 116.67 | 116.67 | — | — | — |
| Unmodified SBR GRP | 0 | 23.33 | 0 | — | — | — |
| MGR-5 | 0 | 0 | 23.33 | — | — | — |
| NR Master batch | 0 | 0 | 0 | 140 | 116.67 | 116.67 |
| Unmodified SBR GRP | 0 | 0 | 0 | 0 | 23.33 | 0 |
| MGR-6 | 0 | 0 | 0 | 0 | 0 | 23.33 |
| Stearic acid | 2 | 1.67 | 1.67 | 2 | 1.67 | 1.67 |
| ZnO | 2 | 1.67 | 1.67 | 2 | 1.67 | 1.67 |
| Sulfur | 1.25 | 1.04 | 1.04 | 1.25 | 1.04 | 1.04 |
| TBBS | 0.83 | 0.69 | 0.69 | 0.83 | 0.69 | 0.69 |
| Piperidine | 0 | 0 | 2 | 0 | 0 | 0 |

A sample C-5, consisting of modified ground rubber MGR-5, fresh rubber (SBR), and curing agents with formulation concentrations according to Table 8 above mixed and cured in accordance with the same equipment and curing procedure utilized to prepare sample C-R-2 above, was prepared.

The cured sample C-R-2, sample C-0-2, and sample C-5, were cut in the milling direction of the cured sheets into ASTM D412 Type C dumbbells, in which the width of the narrow section of each dumbbell was approximately 6.35 mm and the thickness of each dumbbell was approximately 0.8 mm to 1.0 mm. The tensile properties of each sample C-R-2, sample C-0-2, and sample C-5 ASTM D412 Type C dumbbell were measured on an Intron Model 5567 equipped with a 1000 N load cell, with a crosshead speed of 500 mm/min with an initial gap of 65 mm. The strain of each of sample C-R-2, sample C-0-2, and sample C-5 ASTM D412 Type C dumbbell was measured with an extensometer at increasing levels of stress, as is indicated in FIG. 11.

Figure 11:
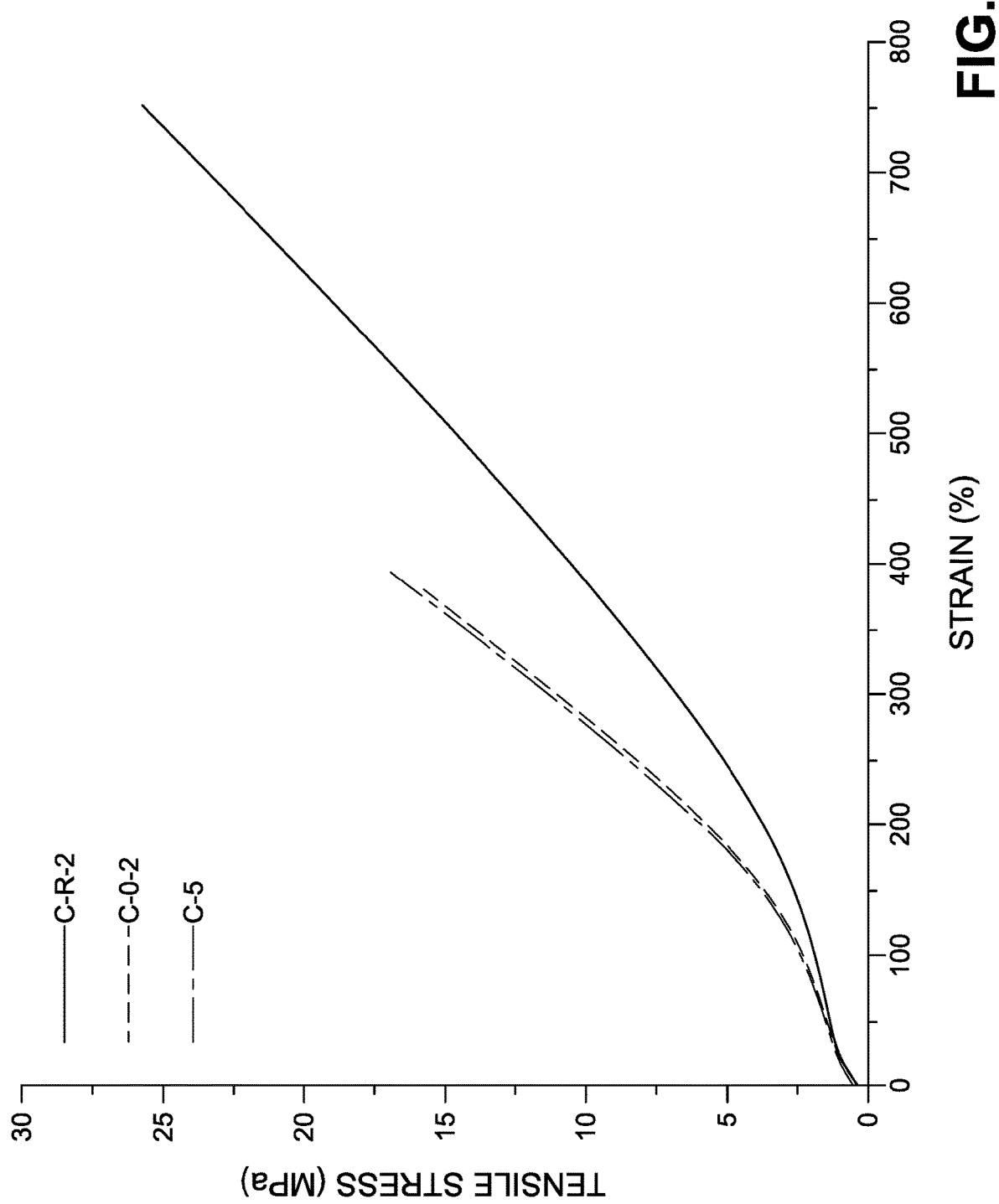
FIG. 11 is a graph of results generated from Example 5, representing tensile strength relative to percent strain for co-cured mixed ground fresh rubber (SBR) and ground styrene butadiene rubber (SBR) particles with and without various surface modifications via surface devulcanization in accordance with the method of modifying devulcanized rubber of the disclosed subject matter.

As shown by the stress-strain results for sample C-0-2 indicated in FIG. 11, and as was expected, the material of sample C-0-2, consisting of co-cured fresh rubber (SBR) and ground SBR particles, exhibited decreased performance compared to sample C-R-2, consisting of cured fresh rubber.

As shown by the stress-strain results for sample C-5 indicated in FIG. 11, when ground SBR particles are first modified via Example 2B (MGR-5) prior to mixing with ground fresh rubber and co-curing with the fresh rubber (SBR), the resulting material exhibited improved performance in comparison to sample C-0-2, although the performance was still worse than that of the vulcanized fresh rubber sample C-0-2.

EXAMPLE 6

Modified NR Ground Rubber Tensile Studies

In order to determine whether the methods demonstrated in Example 1-4 using butadiene rubber apply to natural rubber (NR), modification of vulcanized NR via surface devulcanization similar to Example 2B was carried out. The resultant particles were mixed and cured with fresh rubber (NR) at a microscale. Tensile studies were performed on samples of co-cured mixed fresh rubber (NR) and ground NR particles modified in accordance with Example 2B, described below.

A master batch of fresh rubber was formulated with 100 phr natural rubber and 40 phr carbon black. A control sample ("sample C-R-3") was prepared by mixing 140 phr of the fresh rubber master batch, 2 phr stearic acid, 2 phr zinc oxide, 1.25 sulfur, and 0.83 TBBS with a Brabender 80 cm$^3$ mixer at a speed of 60 rpm and initial temperature of 50 degrees Celsius. A moving die rheometer (MDR 2000) was used to measure curing kinetics at 160 degrees Celsius. Curing was carried out at 160 degrees Celsius under 10 Ton pressure for the duration of 90 minutes ($t_{90}$) on a Dake Hydraulic Mod 4419 compression model. The cured sample was quenched in water.

A master batch of vulcanized rubber was prepared in accordance with Table 4 above, but with NR instead of butadiene rubber. Vulcanized rubber from the master batch was ground into particles having a particle size of approximately 60 mesh or less, referred to herein as "ground NR particles".

More specifically, 15 grams of the ground NR particles were added to a glass-fritted funnel capable of suction filtration. A solution of butylthiol and piperidine in acetone with a volume ratio of 1:10:100 (100 ml) was added into the funnel. The ground NR particles were allowed to dwell in the solution for 1 hour before suction filtration was applied to remove the solution. The ground NR particles were left in the funnel for 1 hour, and were then washed with 300 ml of acetone. The ground NR particles were then dried in a vacuum oven at room temperature for 24 hours. The ground NR particles modified in accordance with Example 6 above are designated as modified ground rubber-6 ("MGR-6") for purposes of this disclosure.

A sample C-0-3, consisting of the above unmodified ground NR particles, fresh rubber (NR), and curing agents with formulation concentrations according to Table 8 above and mixed and cured in accordance with the same equipment and curing procedure utilized to prepare sample C-R-2 above, was prepared.

A sample C-6, consisting of modified ground rubber MGR-6, fresh rubber (NR), and curing agents with formulation concentrations according to Table 8 above mixed and cured in accordance with the same equipment and curing procedure utilized to prepare sample C-R-3 above, was prepared.

The cured sample C-R-3, sample C-0-3, and sample C-6, were cut in the milling direction of the cured sheets into ASTM D412 Type C dumbbells, in which the width of the narrow section of each dumbbell was approximately 6.35 mm and the thickness of each dumbbell was approximately 0.8 mm to 1.0 mm. The tensile properties of each sample C-R-3, sample C-0-3, and sample C-6 ASTM D412 Type C dumbbell were measured on an Intron Model 5567 equipped with a 1000 N load cell, with a crosshead speed of 500 mm/min with an initial gap of 65 mm. The strain of each of sample C-R-3, sample C-0-3, and sample C-6 ASTM D412 Type C dumbbell was measured with an extensometer at increasing levels of stress, as is indicated in FIG. 12.

Figure 12:
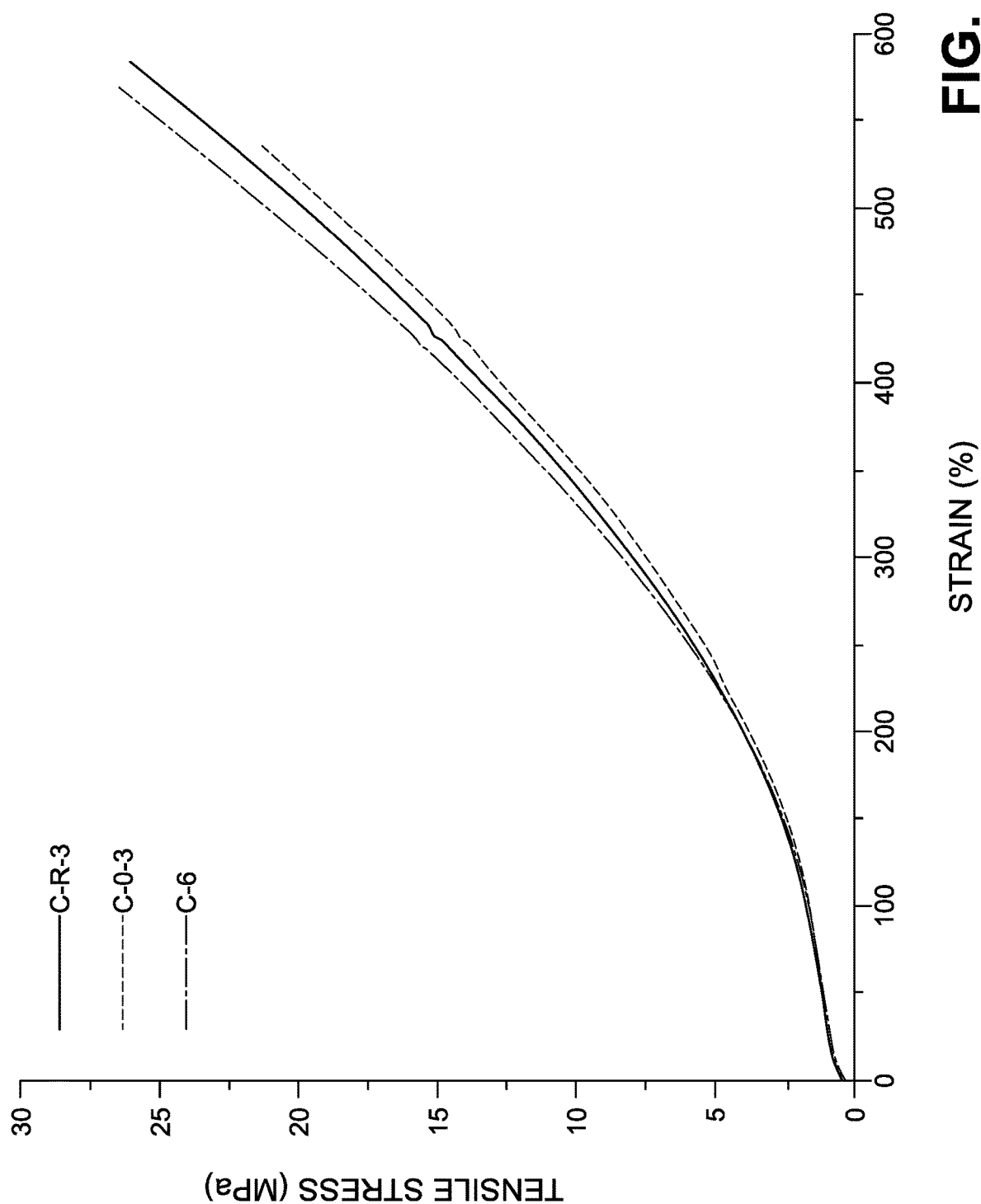
FIG. 12 is a graph of results generated from Example 6, representing tensile strength relative to percent strain for co-cured mixed ground fresh rubber (NR) and ground natural rubber (NR) particles with and without various surface modifications via surface devulcanization in accordance with the method of modifying devulcanized rubber of the disclosed subject matter.

As shown by the stress-strain results for sample C-0-3 indicated in FIG. 12, and as was expected, the material of sample C-0-3, consisting of co-cured fresh rubber (NR) and ground NR particles, exhibited decreased performance compared to sample C-R-3, consisting of cured fresh rubber (NR).

As shown by the stress-strain results for sample C-6 indicated in FIG. 12, when ground NR particles are first modified via Example 2B (MGR-6) prior to mixing with fresh rubber (NR) and co-curing with the fresh rubber (NR), the resulting material exhibited improved performance in comparison to sample C-0-3. The performance of sample C-6 matches that of sample C-R-3.

Thus, the method for modifying vulcanized rubber of the disclosed subject matter address and overcomes the problems associated with prior art rubber recycling methods and minimizes alteration of the network structure of recycled sulfur-cured rubber, while generating strong tack between mixed recycled rubber and fresh rubber to provide optimal adhesion upon subsequent vulcanization. The method of modifying vulcanized rubber of the disclosed subject matter enables ground recycled sulfur-cured rubber particles with larger particles sizes to be utilized in the rubber recycling process, while providing a recycled rubber product with comparable or increased performance to those including smaller particle sizes. In addition, the method of modifying vulcanized rubber the disclosed subject matter allows a greater percentage of recycled rubber to be utilized in the rubber recycling process compared to prior art recycling methods, while providing a recycled rubber product with comparable or increased performance. The method of modifying vulcanized rubber of the disclosed subject matter also eliminates the need to fully devulcanize the recycled sulfur-cured rubber prior to vulcanization of the recycled rubber and fresh rubber, thereby eliminating an often complex and expensive step and decreasing the recycling operation costs. In addition, the method of modifying vulcanized rubber of the disclosed subject matter provides a vulcanizable product ready for further processing comprising a mixture of surface-devulcanized ground rubber particles modified in accordance with the method of modifying vulcanized rubber of the disclosed subject matter and ground fresh rubber.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the disclosed subject matter has been described with reference to specific embodiments. It shall be understood that these illustrations are by way of example and not by way of limitation, as the scope of the disclosed subject matter is not limited to the exact details shown or described. Potential modifications and alterations will occur to others upon a reading and understanding of this disclosure, and it is understood that the disclosed subject matter includes all such modifications and alterations and equivalents thereof.

Having now described the features, discoveries and principles of the disclosed subject matter, the manner in which the method of modifying vulcanized rubber of the disclosed subject matter is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. A vulcanizable rubber product comprising surface-devulcanized ground rubber particles and fresh rubber, wherein said surface-devulcanized ground rubber particles are derived by treating ground rubber particles with a surface devulcanization catalyst.

2. The vulcanizable rubber product of claim 1, wherein the surface devulcanization catalyst includes a thiol.

3. The vulcanizable rubber product of claim 1, wherein the surface devulcanization catalyst includes a base.

4. The vulcanizable rubber product of claim 2, wherein the surface devulcanization catalyst further includes a solvent in which the thiol is soluble, the solvent only minimally swelling the ground rubber particles.

5. The vulcanizable rubber product of claim 1, wherein said surface-devulcanized ground rubber particles are surface-devulcanized to a depth of about 100 μm or less.

6. A vulcanizable rubber product comprising surface-devulcanized ground rubber particles, fresh rubber, and an agent that reduces the modulus differences at the interface between the surface-devulcanized ground rubber particles and fresh rubber upon co-curing of the surface-devulcanized ground rubber particles and fresh rubber.

7. The vulcanizable rubber product of claim 6, wherein the agent is a base.

8. The vulcanizable rubber product of claim 6, wherein the agent is piperidine.

9. A method for recycling rubber comprising the steps:
a. providing a recycled rubber compound;
b. grinding the recycled rubber compound to form ground rubber particles; and
c. devulcanizing a surface of the ground rubber particles with a surface devulcanization catalyst to form surface-devulcanized ground rubber particles.

10. The method for recycling rubber of claim 9, wherein the surface devulcanization catalyst includes a thiol.

11. The method for recycling rubber of claim 9, wherein the surface devulcanization catalyst includes a base.

12. The method for recycling rubber of claim 10, wherein the surface devulcanization catalyst further includes a solvent in which the thiol is soluble, the solvent only minimally swelling the ground rubber particles.

13. The method for recycling rubber of claim 9, further comprising the step of mixing the surface-devulcanized ground rubber particles with fresh rubber.

14. The method for recycling rubber of claim 13, further comprising the step of curing the mixture of surface-devulcanized ground rubber particles and fresh rubber.

15. The method for recycling rubber of claim 9, wherein the method is conducted via a batch or a continuous process.

16. The method for recycling rubber of claim 9, wherein the surface of the ground rubber particles is devulcanized to a depth of about 100 μm or less.

17. The method for recycling rubber of claim 16, wherein the surface devulcanization catalyst is modified to significantly reduce a rate of diffusion of the surface devulcanization catalyst within a matrix of the ground rubber particles to limit the surface devulcanization of the ground rubber particles to the depth of less than 100 μm.

18. A vulcanized rubber product of the method for recycling rubber of claim 9.

19. The vulcanizable rubber product of claim 1, wherein said surface-devulcanized ground rubber particles are surface-devulcanized to a depth of from about 10 μm to about 100 μm.

20. A method for recycling rubber comprising the steps:
a. providing a recycled rubber compound;
b. grinding the recycled rubber compound to form ground rubber particles; and
c. devulcanizing a surface of the ground rubber particles with a surface devulcanization catalyst to form surface-devulcanized ground rubber particles, wherein the surface of the ground rubber particles is devulcanized to a depth of about 100 μm or less and the surface devulcanization catalyst is modified to significantly reduce a rate of diffusion of the surface devulcanization catalyst within a matrix of the ground rubber particles to limit the surface devulcanization of the ground rubber particles to the depth of less than 100 μm.

* * * * *